(12) United States Patent
Takeuchi

(10) Patent No.: US 11,090,814 B2
(45) Date of Patent: Aug. 17, 2021

(54) ROBOT CONTROL METHOD

(71) Applicant: Seiko Epson Corporation, Tokyo (JP)

(72) Inventor: Kaoru Takeuchi, Azumino (JP)

(73) Assignee: Seiko Epson Corporation

( * ) Notice: Subject to any disclaimer, the term of this patent is extended or adjusted under 35 U.S.C. 154(b) by 113 days.

(21) Appl. No.: 16/430,513

(22) Filed: Jun. 4, 2019

(65) Prior Publication Data

US 2019/0283259 A1 Sep. 19, 2019

Related U.S. Application Data

(63) Continuation of application No. 15/458,280, filed on Mar. 14, 2017, now Pat. No. 10,350,768.

(30) Foreign Application Priority Data

Mar. 18, 2016 (JP) ................................. 2016-054959

(51) Int. Cl.
*B25J 13/08* (2006.01)
*B25J 9/16* (2006.01)
*G05B 19/423* (2006.01)

(52) U.S. Cl.
CPC ........... *B25J 13/085* (2013.01); *B25J 9/1633* (2013.01); *G05B 19/423* (2013.01)

(58) Field of Classification Search
CPC .... B25J 11/0005; B25J 13/084; B25J 9/0087; B25J 9/163; B25J 9/1671; B25J 9/1676; B25J 9/1697; B25J 9/1682; G05B 19/42; G05B 2219/39451; G05B 2219/39466; G05B 2219/40116; G05B 19/423; G06F 17/00; G06K 9/2081; G06K 9/6255; G06K 9/66; G06N 5/025; G06N 7/005; G06N 20/00; G06N 99/005; Y10S 901/01; Y10S 901/03; Y10S 901/09; Y10S 901/31; Y10S 901/46; Y10S 901/47; Y02P 90/80; Y02P 90/86

See application file for complete search history.

(56) References Cited

U.S. PATENT DOCUMENTS

| 5,608,618 | A | 3/1997 | Kosaka et al. |
| 5,748,854 | A | 5/1998 | Watanabe et al. |
| 6,088,628 | A | 7/2000 | Watanabe et al. |
| 7,778,732 | B2 * | 8/2010 | Adachi ................. B25J 9/0003 700/245 |

(Continued)

FOREIGN PATENT DOCUMENTS

| JP | S63-162180 A | 7/1988 |
| JP | 03-123908 A | 5/1991 |

(Continued)

*Primary Examiner* — Bhavesh V Amin
(74) *Attorney, Agent, or Firm* — Harness, Dickey & Pierce, P.L.C.

(57) ABSTRACT

A control device includes a robot control section that controls a robot including a hand and a force detecting section; and an operation-mode switching section that switches, when storing a position and a posture of the robot, a first mode for moving the robot by the robot control section until an external force applied to the hand satisfies a predetermined condition and a second mode for moving the robot by the robot control section on the basis of an external force applied to a first part included in the robot.

8 Claims, 13 Drawing Sheets

(56) References Cited

U.S. PATENT DOCUMENTS

| | | | | |
|---|---|---|---|---|
| 8,315,735 B2* | 11/2012 | Nihei | ................... | B25J 9/1676 700/245 |
| 8,360,997 B2* | 1/2013 | Ferrara | ................. | A63B 23/12 601/5 |
| 8,554,368 B2* | 10/2013 | Fielding | ................. | A61B 34/30 700/247 |
| 8,855,815 B2* | 10/2014 | Mizutani | ............. | G05B 19/423 700/245 |
| 8,996,174 B2* | 3/2015 | Brooks | ................... | G06K 9/66 700/259 |
| 9,043,025 B2* | 5/2015 | Brooks | ................. | B25J 9/1676 700/255 |
| 9,044,257 B2* | 6/2015 | Fielding | ................. | A61B 34/37 |
| 9,427,871 B2* | 8/2016 | Ciarelli | ..................... | F16P 3/14 |
| 9,513,321 B2* | 12/2016 | Frangen | .................. | G01L 1/146 |
| 9,554,864 B2* | 1/2017 | Taylor | ................... | B25J 15/0466 |
| 9,579,798 B2* | 2/2017 | Wang | .................... | B25J 9/1694 |
| 9,662,174 B2* | 5/2017 | Taylor | ................... | A61B 34/72 |
| 9,696,221 B2* | 7/2017 | Lauzier | ................. | B25J 9/0081 |
| 9,962,836 B2* | 5/2018 | Zunke | ................. | B25J 19/0095 |
| 10,260,970 B2* | 4/2019 | Lauzier | ................. | B25J 9/0081 |
| 10,278,781 B2* | 5/2019 | Taylor | ................... | A61B 90/06 |
| 10,556,353 B2* | 2/2020 | Su | ............................ | B25J 19/06 |
| 10,717,194 B2* | 7/2020 | Griffiths | ................ | A61B 34/76 |
| 2001/0045809 A1 | 11/2001 | Mukai | | |
| 2004/0257021 A1 | 12/2004 | Chang et al. | | |
| 2006/0049939 A1* | 3/2006 | Haberer | ................... | F16P 3/142 340/541 |
| 2008/0021597 A1* | 1/2008 | Merte | ................... | F16P 3/147 700/255 |
| 2008/0161970 A1* | 7/2008 | Adachi | ................. | B25J 9/1676 700/253 |
| 2009/0182436 A1* | 7/2009 | Ferrara | ................... | B25J 9/142 623/57 |
| 2009/0187194 A1* | 7/2009 | Hamada | ............ | A61B 17/8897 606/104 |
| 2009/0192524 A1* | 7/2009 | Itkowitz | ................. | A61B 90/36 606/130 |
| 2010/0138038 A1* | 6/2010 | Moon | .................... | B25J 13/085 700/245 |
| 2010/0145515 A1* | 6/2010 | Nakanishi | .............. | B25J 9/1676 700/255 |
| 2010/0168950 A1* | 7/2010 | Nagano | ................. | B25J 9/1666 701/25 |
| 2010/0206580 A1* | 8/2010 | Tessari | .................... | E21B 23/12 166/377 |
| 2010/0235000 A1* | 9/2010 | Hsu | ........................ | B25J 13/081 700/275 |
| 2011/0073620 A1* | 3/2011 | Verrilli | .................... | F04B 7/045 222/325 |
| 2011/0089146 A1* | 4/2011 | Takahashi | ............. | B23K 11/115 219/91.2 |
| 2011/0160745 A1* | 6/2011 | Fielding | ................. | A61B 34/37 606/130 |
| 2011/0301753 A1* | 12/2011 | Bonin | .................... | B25J 9/1674 700/245 |
| 2012/0022689 A1* | 1/2012 | Kapoor | ................. | B25J 9/1666 700/255 |
| 2012/0043831 A1* | 2/2012 | Sakakibara | .............. | B25J 19/06 307/326 |
| 2012/0253514 A1 | 10/2012 | Sugimoto et al. | | |
| 2013/0184869 A1* | 7/2013 | Inazumi | ................. | B25J 9/1612 700/260 |
| 2013/0198625 A1* | 8/2013 | Anderson | ............... | G06F 3/016 715/701 |
| 2013/0304258 A1* | 11/2013 | Taylor | .................... | A61B 34/30 700/260 |
| 2013/0342224 A1* | 12/2013 | Frangen | ................ | G06F 3/0445 324/679 |
| 2013/0345718 A1* | 12/2013 | Crawford | ............. | A61B 17/025 606/130 |
| 2013/0345872 A1* | 12/2013 | Brooks | ................. | B25J 9/1682 700/259 |
| 2014/0066944 A1* | 3/2014 | Taylor | .................... | B25J 15/0466 606/103 |
| 2014/0067121 A1* | 3/2014 | Brooks | ................. | B25J 9/1676 700/255 |
| 2014/0142593 A1* | 5/2014 | Fielding | ................. | B25J 9/1689 606/130 |
| 2014/0188281 A1 | 7/2014 | Nagai et al. | | |
| 2015/0049911 A1* | 2/2015 | Doettling | ............ | G06T 7/285 382/103 |
| 2015/0158178 A1* | 6/2015 | Burmeister | ........... | B25J 9/1697 382/203 |
| 2015/0323398 A1* | 11/2015 | Lauzier | ................... | G01L 5/226 73/862.08 |
| 2016/0100898 A1 | 4/2016 | Jinno et al. | | |
| 2016/0100899 A1 | 4/2016 | Jinno et al. | | |
| 2016/0207197 A1* | 7/2016 | Takahashi | .............. | B25J 9/1676 |
| 2016/0243700 A1* | 8/2016 | Naitou | .................. | B25J 9/1633 |
| 2016/0243705 A1* | 8/2016 | Naitou | .................. | B25J 13/085 |
| 2017/0156805 A1* | 6/2017 | Taylor | .................... | A61B 90/06 |
| 2017/0254709 A1* | 9/2017 | Lauzier | ..................... | G01L 1/14 |
| 2017/0266815 A1 | 9/2017 | Takeuchi | | |

FOREIGN PATENT DOCUMENTS

| | | |
|---|---|---|
| JP | 05-204441 A | 8/1993 |
| JP | H05-237784 A | 9/1993 |
| JP | 06-047688 A | 2/1994 |
| JP | 2001-287899 A | 10/2001 |
| JP | 2010-023184 A | 2/2010 |
| JP | 2014-233814 A | 12/2014 |

* cited by examiner

ROBOT CONTROL METHOD

CROSS-REFERENCE TO RELATED APPLICATIONS

This application is a continuation of U.S. patent application Ser. No. 15/458,280, filed Mar. 14, 2017, which claims priority to Japanese Patent Application No. 2016-054959, filed Mar. 18, 2016, both of which are hereby expressly incorporated by reference herein in their entireties.

BACKGROUND

1. Technical Field

The present invention relates to a control device, a robot, and a robot system.

2. Related Art

Researches and developments of a technique for teaching a robot about a motion on the basis of a force and a moment detected by a force sensor included in the robot have been performed.

Concerning the technique, there is known a direct teaching device that causes a teaching operator to apply a force to a fingertip effector provided at a tip portion of an arm of a robot, detects the applied force with a force sensor included in a wrist section, guides the fingertip effector to a target position according to force control based on a force signal output by the force sensor, and stores, as teaching data, the position and the posture of the fingertip effector after being guided (see JP-A-03-123908 (Patent Literature 1)).

However, in such a direct teaching device, it is sometimes difficult to accurately change the position and the posture of the fingertip effector to a desired position and a desired posture unless parameters input in advance, that is, force control parameters used for calculating a movement amount of the fingertip effector by the force control are accurately set. In the direct teaching device, even if the force control parameters can be accurately set, it is sometimes difficult for the teaching operator to accurately apply a desired force to the fingertip effector in a desired direction. It is sometimes difficult to accurately change the position and the posture of the fingertip effector to the desired position and the desired posture. As a result, the direct teaching device sometimes cannot accurately teach the robot about the desired position and the desired posture.

SUMMARY

An aspect of the invention is directed to a control device includes a robot control section that controls a robot including a hand and a force detecting section; and a operation-mode switching section that switches, when storing a position and a posture of the robot, a first mode for moving the robot by the robot control section until an external force applied to the hand satisfies a predetermined condition and a second mode for moving the robot by the robot control section on the basis of an external force applied to a first part included in the robot.

With this configuration, the control device switches, when storing the position and the posture of the robot, the first mode for moving the robot until the external force applied to the hand satisfies the predetermined condition and the second mode for moving the robot on the basis of the external force applied to the first part included in the robot. Consequently, the control device can highly accurately change the position and the posture of the robot to a desired position and a desired posture according to the first mode or the second mode.

In another aspect of the invention, the control device further comprising a force-detection-information acquiring section that acquires force detection information from the force detecting section. In the first mode, the robot control section brings the hand close to a target object according to control based on the force detection information until the predetermined condition is satisfied. the control device may be configured such that, in the first mode, the control device brings the hand close to a target object according to control based on an output of the force detecting section until the predetermined condition is satisfied.

With this configuration, in the first mode, the control device brings the hand close to the target object through the control based on the output of the force detecting section. Consequently, in the first mode, the control device can highly accurately change the position and the posture of the robot to a desired position and a desired posture associated with the target object without causing a user to apply an external force to the hand.

In another aspect of the invention, the control device may be configured such that the predetermined condition is that at least an external force toward a first direction in the external force applied to the hand increases to be larger than zero and at least an external force toward a second direction different from the first direction in the external force applied to the hand decreases to zero.

With this configuration, in the first mode, the control device moves the robot until at least the external force toward the first direction in the external force applied to the hand increase to be larger than zero and at least the external force toward the second direction in the external force applied to the hand decreases to zero. Consequently, in the first mode, the control device can move the position of the robot toward a direction opposite to the first direction while keeping the posture of the robot.

In another aspect of the invention, the control device may be configured such that the first direction is a translational direction and the second direction may be a rotational direction.

With this configuration, in the first mode, the control device moves the robot until at least a force toward the first direction, which is the translational direction, in a force applied to the hand increases to be larger than zero and a moment toward the second direction, which is the rotational direction, decreases to zero. Consequently, in the first mode, the control device can move the position of the robot toward the direction opposite to the first direction, which is the translational direction, while keeping the posture of the robot.

In another aspect of the invention, the control device may be configured such that, in the first mode, the control device stores, when the predetermined condition is satisfied, the position and the posture at a present time.

With this configuration, in the first mode, when the predetermined condition is satisfied, the control device stores the position and the posture of the robot at the present time. Consequently, in the first mode, the control device can operate the robot on the basis of the position and the posture of the robot stored when the predetermined condition is satisfied.

In another aspect of the invention, the control device may be configured such that, in the second mode, the robot control section included the control device moves a second part included in the robot in a predetermined direction by a predetermined amount on the basis of the external force applied to the first part.

With this configuration, the control device moves the second part included in the robot in the predetermined direction by the predetermined amount on the basis of the external force applied to the first part included in the robot. Consequently, in the second mode, the control device can highly accurately change the position and the posture of the robot to the desired position and the desired posture on the basis of the external force applied to the first part by the user.

In another aspect of the invention, the control device may be configured such that the control device stores the position and the posture at a present time after moving the second part in the predetermined direction by the predetermined amount.

With this configuration, the control device stores the position and the posture of the robot at the present time after moving the second part in the predetermined direction by the predetermined amount. Consequently, in the second mode, the control device can control the robot on the basis of the position and the posture of the robot stored after the second part is moved in the predetermined direction by the predetermined amount.

In another aspect of the invention, the control device may be configured such that one or both of a translational direction and a rotational direction are included in the predetermined direction.

With this configuration, the control device stores the position and the posture of the hand at the present time after moving the second part in one or both of the translational direction and the rotational direction by a predetermined amount. Consequently, in the second mode, the control device can control the robot on the basis of the position and the posture stored after the second part is moved in one or both of the translational direction and the rotational direction by the predetermined amount.

In another aspect of the invention, the control device may be configured such that the predetermined direction is a direction corresponding to a portion of the first part, and the robot control section included the control device moves, according to the external force applied to the first part, the second part in a direction corresponding to a portion to which the external force is applied in the portion of the first part by the predetermined amount.

With this configuration, the control device moves, according to the external force applied to the first part included in the robot, the second part in the direction corresponding to the portion to which the external force is applied in the portion of the first part by the predetermined amount. Consequently, the control device can cause the user to easily change the direction in which the second part is moved.

Another aspect of the invention is directed to a robot controlled by the control device.

With this configuration, the robot switches, when storing the position and the posture of the robot, the first mode for moving the robot until the external force applied to the hand satisfies the predetermined condition and the second mode for moving the robot on the basis of the external force applied to the first part included in the robot. Consequently, the robot can highly accurately change the position and the posture of the robot to a desired position and a desired posture according to the first mode or the second mode.

Another aspect of the invention is directed to a robot system including: the control device; and a robot controlled by the control device.

With this configuration, the robot system switches, when storing the position and the posture of the robot, the first mode for moving the robot until the external force applied to the hand satisfies the predetermined condition and the second mode for moving the robot on the basis of the external force applied to the first part included in the robot. Consequently, the robot system can highly accurately change the position and the posture of the robot to a desired position and a desired posture according to the first mode or the second mode.

Consequently, the control device, the robot, and the robot system switch, when storing the position and the posture of the robot, the first mode for moving the robot until the external force applied to the hand satisfies the predetermined condition and the second mode for moving the robot on the basis of the external force applied to the first part included in the robot. Consequently, the control device, the robot, and the robot system can highly accurately change the position and the posture of the robot to a desired position and a desired posture according to the first mode or the second mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

An embodiment of the invention is explained below with reference to the drawings.
Configuration of a Robot System First, the configuration of a robot system 1 is explained.

Figure 1:
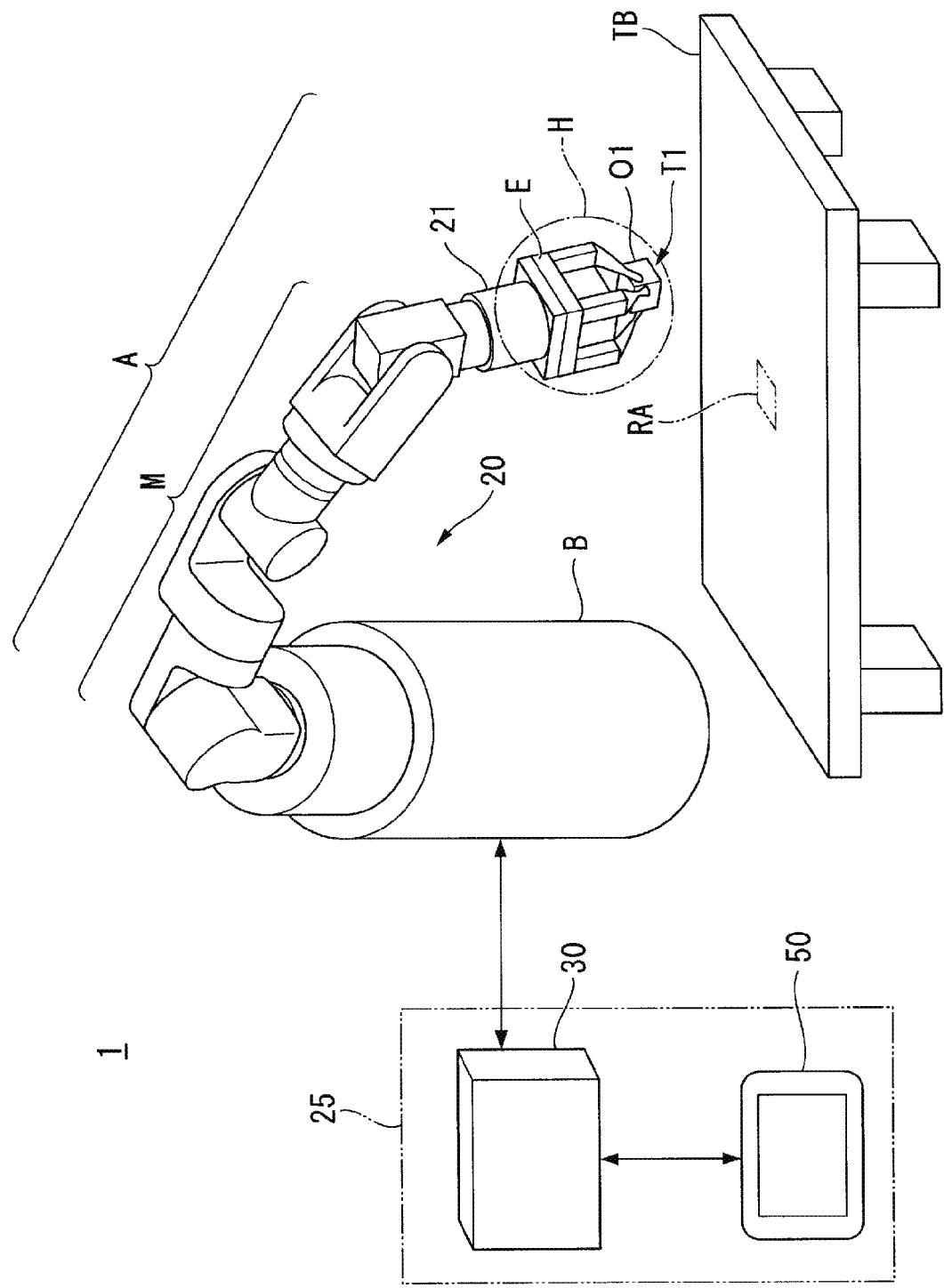
FIG. 1 is a diagram showing an example of the configuration of a robot system according to an embodiment.

FIG. 1 is a diagram showing an example of the configuration of the robot system 1 according to this embodiment. The robot system 1 includes a robot 20 and a control device 25. The control device 25 is configured by a robot control device 30 and a teaching device 50 separate from the robot control device 30. Note that, instead of this configuration, the control device 25 may be configured by integrating the robot control device 30 and the teaching device 50. In this case, the control device 25 has functions of the robot control device 30 and the teaching device 50 explained below.

The robot 20 is a single-arm robot including an arm A and a supporting stand B that supports the arm A. The single-arm robot is a robot including one arm like the arm A in this example. Note that the robot 20 may be a plural-arm robot instead of the single-arm robot. The plural-arm robot is a robot including two or more arms (e.g., two or more arms A). Note that, among plural-arm robots, a robot including two arms is referred to as double-arm robot as well. That is, the robot 20 may be a double-arm robot including two arms or may be a plural-arm robot including three or more arms (e.g., three or more arms A). The robot 20 may be another robot such as a SCARA robot or a Cartesian coordinate robot. The Cartesian coordinate robot is, for example, a gantry robot.

The arm A includes an end effector E, a manipulator M, and a force detecting section 21.

In this example, the end effector E is an end effector including finger sections capable of gripping an object. Note that the end effector E may be an end effector capable of lifting an object with the suction of the air, a magnetic force, a jig, or the like instead of the end effector including the finger sections or another end effector.

The end effector E is communicatively connected to the robot control device 30 by a cable. Consequently, the end effector E performs a motion based on a control signal acquired from the robot control device 30. Note that wired communication via the cable is performs according to a standard such as the Ethernet (registered trademark) or the USB. The end effector E may be connected to the robot control device by wireless communication performed according to a communication standard such as the Wi-Fi (registered trademark).

The manipulator M includes seven joints. The seven joints respectively include not-shown actuators. That is, the arm A including the manipulator M is an arm of a seven-axis vertical multi-joint type. The arm A performs a motion of a seven-axis degree of freedom according to associated operation by the supporting stand B, the end effector E, the manipulator M, and the actuators of the respective seven joints included in the manipulator M. Note that the arm A may move at a degree of freedom of six or less axes or may move at a degree of freedom of eight or more axes.

When the arm A moves at the seven-axis degree of freedom, postures that the arm A can take increases compared with when the arm A moves at the degree of freedom of six or less axes. Consequently, the arm A can move smoothly and easily avoid interference with an object present around the arm A. When the arm A moves at the seven-axis degree of freedom, computational complexity of the control of the arm A is small and the control of the arm A is easy compared with when the arm A moves at the degree of freedom of eight or more exes.

The seven actuators (included in the joints) included in the manipulator M are respectively communicably connected to the robot control device 30 by cables. Consequently, the actuators operate the manipulator M on the basis of a control signal acquired from the robot control device 30. The actuators include encoders. The encoders output information indicating rotation angles of the actuators including the encoders to the robot control device 30. Note that the wired communication via the cable is performed according to a standard such as the Ethernet (registered trademark) or the USB. A part or all of the seven actuators included in the manipulator M may be connected to the robot control device 30 by wireless communication performed according to a communication standard such as the Wi-Fi (registered trademark).

The force detecting section 21 is provided between the end effector E and the manipulator M. The force detecting section 21 is, for example, a force sensor. The force detecting section 21 detects an external force applied to a hand H. In this example, the hand H means the end effector E or an object griped by the end effector E. In this example, the external force means both of a force applied to the hand H and a moment applied to the hand H. That is, the force detecting section 21 detects the magnitude of the force applied to the hand H, that is, a force applied in the direction of each of the coordinate axes of a force detection coordinate system. The force detecting section 21 detects the magnitude of a moment applied to the hand H, that is, a moment applied around each of the coordinate axes. The force detecting section 21 outputs force detection information including force detection values indicating the detected magnitudes to the robot control device 30 through communication. The force detection coordinate system is a three-dimensional local coordinate system associated with the force detecting section 21 to move together with the force detecting section 21. Note that the external force may mean, instead of the force and the moment, one of the force applied to the hand H and the moment applied to the hand H.

The force detection information is used for force control, which is control based on force detection information of the arm A by the robot control device 30. The force control means, for example, compliant motion control such as impedance control. Note that the force detecting section 21 may be another sensor that detects the external force applied to the hand H such as a torque sensor.

The force detecting section 21 is communicably connected to the robot control device 30 by a cable. Wired communication via the cable is performed according to a standard such as the Ethernet (registered trademark) or the USB. Note that the force detecting section 21 and the robot control device 30 may be connected by wireless communication performed according to a communication standard such as the Wi-Fi (registered trademark).

In this example, the robot control device 30 is a robot controller. The robot control device 30 acquires teaching point information from the teaching device 50. The teaching point information is information indicating a teaching point. The teaching point is an imaginary point representing a position and a posture serving as targets for changing the position and the posture of the robot 20 when the robot control device 30 operates the robot 20. Teaching point position information, teaching point posture information, and teaching point identification information are associated with the teaching point. The teaching point position information is information indicating the position of the teaching point. The teaching point posture information is information indicating the posture of the teaching point. The teaching point identification information is information for identifying the teaching point.

In this example, the position of the teaching point is represented by a position in a robot coordinate system RC of the origin of a teaching point coordinate system, which is a three-dimensional local coordinate system associated with the teaching point. The posture of the teaching point is represented by directions in the robot coordinate system RC of coordinate axes of the teaching point coordinate system.

The robot control device 30 stores the teaching point information acquired from the teaching device 50. The robot control device 30 generates, on the basis of the stored teaching point information, a control signal for operating the robot 20. Specifically, the robot control device 30 acquires information indicating rotation angles of the actuators from the encoders included in the joints of the manipulator M. The robot control device 30 generates a control signal on the basis of the stored teaching point information and the acquired information indicating the rotation angles. The robot control device 30 transmits the generated control signal to the robot 20 and operates the actuators to thereby operate the robot 20. A control signal for controlling the end effector E is also included in the control signal.

The robot control device 30 acquires various instructions from the teaching device 50. The robot control device 30 switches the operation mode of the robot control device 30 on the basis of an operation mode switching instruction for switching the operation mode of the robot control device 30 among the acquired instructions. Specifically, in this example, the robot control device 30 switches the operation mode to anyone of a first mode, a second mode, and a third mode on the basis of the operation mode switching instruction. The robot control device 30 causes the robot 20 to perform operation corresponding to the switched operation mode. The operation mode switching instruction is an instruction including information indicating anyone of the first mode, the second mode, and the third mode. Note that the robot control device 30 may switch the operation mode to the first mode or the second mode, may switch the operation mode to the second mode or the third mode, or may switch the operation mode to the first mode or the third mode. The robot control device 30 may switch the operation mode to a part or all of the three modes of the first mode to the third mode or other modes different from the three modes.

In this example, the first mode is an automatic operation mode. The automatic operation mode is a mode for operating the robot 20 until the external force applied to the hand H satisfies a first predetermined condition. That is, the first mode is a mode in which the robot control device 30 operates the robot 20 until the first predetermined condition is satisfied according to force control. Note that the first mode may be another mode instead of the automatic operation mode. The first predetermined condition is an example of a predetermined condition. The first predetermined condition is explained below.

In this example, the second mode is a jog operation mode. The jog operation mode is a mode for moving a second part included in the robot 20 in a predetermined direction by a predetermined amount on the basis of an external force applied to a first part included in the robot 20. In the following explanation, an example is explained in which the first part and the second part are the same part and the first part and the second part are the hand H. That is, the second mode is a mode for moving the hand H in the predetermined direction by the predetermined amount on the basis of the external force applied to the hand H. Note that the first part may be another part included in the robot 20 instead of the hand H. The second part may be, instead of the hand H, a part different from the first part among other parts included in the robot 20. The second mode may be another mode instead of the jog operation mode.

In this example, the third mode is a direct operation mode. The direct operation mode is a mode for moving, on the basis of the external force applied to the hand H included in the robot 20, the hand H in an applied direction of the external force by an amount corresponding to the magnitude of the external force. That is, the third mode is a mode in which the robot control device 30 operates the robot 20 when the user moves the robot 20 in direct teaching. Note that the third mode may be another mode instead of the direct operation mode. In the following explanation, since the operation of the robot 20 by the third mode is operation known in the direct teaching in the past, explanation concerning the third mode is omitted.

The robot control device 30 outputs, on the basis of a position and posture information output instruction for outputting information indicating the position and the posture of the robot 20 at the present time among the instructions acquired from the teaching device 50 to the teaching device 50, the information to the teaching device 50.

Note that the robot control device 30 may be incorporated in the robot 20 instead of being set on the outside of the robot 20.

In this example, the teaching device 50 is a teaching pendant. The teaching device 50 outputs various instructions to the robot control device 30 on the basis of operation received from the user. The teaching device 50 outputs an operation mode switching instruction to the robot control device 30 to thereby cause the robot control device 30 to switch the operation mode.

The teaching device 50 outputs, to the robot control device 30, the position and posture information output instruction among the instructions output to the robot control device 30 to thereby acquire information indicating the position and the posture of the robot 20 at the present time from the robot control device 30. The teaching device 50 generates teaching point information on the basis of the acquired information. The teaching device 50 outputs the generated teaching point information to the robot control device 30 and causes the robot control device 30 to store the teaching point information. That is, the teaching device 50 teaches the robot control device 30 about a teaching point indicated by the generated teaching point information.

The teaching device 50 is communicatively connected to the robot control device 30 by a cable. Wired communication via the cable is performed according to a standard such as the Ethernet (registered trademark) or the USB (Universal Serial Bus). Note that the teaching device 50 and the robot control device 30 may be connected by wireless communication performed according to a communication standard such as the Wi-Fi (registered trademark).

Note that the teaching device 50 may be, instead of the teaching pendant, a remote controller or the like having the functions of the teaching device 50 and capable of outputting an instruction to the robot control device 30.

Overview of Processing in which the Robot Control Device Operates the Robot

An overview of processing in which the robot control device 30 operates the robot 20 is explained.

As shown in FIG. 1, in this example, the robot 20 grips an object O1 in advance with the end effector E. That is, the hand H in this example means the end effector E or the object O1 gripped by the end effector E. The object O1 is, for example, an industrial component, member, or product. Note that the object O1 may be, instead the industrial component, the member, the product, or the like, another object such as a component a member, or a product of daily goods different from the industrial one or an organism. In the example shown in FIG. 1, the object O1 is shown as an object having a rectangular parallelepiped shape. Note that the shape of the object O1 may be another shape instead of the rectangular parallelepiped shape.

The robot control device 30 sets a control point T1, which is a TCP (Tool Center Point) moving together with the end effector E, in a position associated with the end effector E in advance. The position associated with the end effector E in advance is, for example, the position of the center of gravity of the object O1 gripped in advance by the end effector E. Note that the position associated with the end effector E may be, instead of the position of the center of gravity of the object O1, another position such as the position of the center of gravity of the end effector E or may be any position associated with the manipulator M.

Control point position information, which is information indicating the position of the control point T1, and control point posture information, which is information indicating the posture of the control point T1, are associated with the control point T1. Note that, in addition to these kinds of information, other kinds of information may be associated with the control point T1. When the robot control device 30 designates (determines) the control point position information and the control point posture information, the position and the posture of the control point T1 are determined. The position and the posture are a position and a posture in the robot coordinate system RC. The robot control device 30 designates the control point position information and the control point posture information. The robot control device 30 operates the arm A, matches the position of the control point T1 with a position indicated by the designated control point position information, and matches the posture of the control point T1 with a posture indicated by the designated control point posture information. That is, the robot control device 30 designates the control point position information and the control point posture information to thereby operate the robot 20.

In this example, the position of the control point T1 is represented by a position in the robot coordinate system RC of the origin of a control point coordinate system TC1. The posture of the control point T1 is represented by directions in the robot coordinate system RC of coordinate axes of the control point coordinate system TC1. The control point coordinate system TC1 is a three-dimensional local coordinate system associated with the control point T1 to move together with the control point T1. Note that, in this example, the position and the posture of the object O1 are represented by the position and the posture of the control point T1. In this example, the directions of the coordinate axes of the control point coordinate system TC1 coincide with the directions of the coordinate axes of the force detection coordinate system explained above. Note that the directions of the coordinate axes of the control point coordinate system TC1 does not have to coincide with the directions of the coordinate axes of the force detection coordinate system.

The robot control device 30 sets the control point T1 on the basis of control point setting information input from the user in advance. The control point setting information is, for example, information indicating relative positions and relative postures of the position and the posture of the center of gravity of the end effector E and the position and the posture of the control point T1. Note that, instead of the information, the control point setting information may be information indicating relative positions and relative postures of some position and posture associated with the end effector E and the position and the posture of the control point T1, may be information indicating relative positions and relative postures of some position and posture associated with the manipulator M and the position and the posture of the control point T1, or may be information indicating relative positions and relative postures of some position and posture associated with another part of the robot 20 and the position and the posture of the control point T1.

In the following explanation, as an example, the position and the posture of the robot 20 are the position and the posture of the control point T1. Note that the position and the posture of the robot 20 may be the position and the posture of another part that moves according to the operation of the robot 20.

The robot control device 30 operates the robot 20 on the basis of the teaching point information. When operating the robot 20 on the basis of the teaching point information, the robot control device 30 designates, on the basis of an operation program input in advance by the user, in order, one or more teaching points indicated by the teaching point information. The robot control device 30 designates, as control point position information, teaching point position information associated with a designated teaching point, which is a teaching point designated by the robot control device 30, and designates, as control point posture information, teaching point posture information associated with the designated teaching point. That is, the robot control device 30 designates the control point position information and the control point posture information on the basis of the designated teaching point. Consequently, the robot control device 30 can match the control point T1 with the designated teaching point. Note that, in this example, a certain teaching point and the control point T1 coinciding with each other means that the position and the posture of the teaching point and the position and the posture of the control point T1 coincide with each other.

When the operation mode is any one of the first mode to the third mode, the robot control device 30 operates the robot 20 on the basis of force detection information acquired from the force detecting section 21.

Specifically, the robot control device 30 acquires force detection information from the force detecting section 21. When the operation mode is the first mode, the robot control device 30 changes, on the basis of the acquired force detection information, the position and the posture of the control point T1 to a position and a posture for realizing a state in which an external force applied to the hand H satisfies the first predetermined condition. The robot control device 30 calculates the position and the posture for realizing the state on the basis of force control parameters input to the robot control device 30 in advance, an equation of dynamic motion, and the force detection information.

When the operation mode is the second mode, the robot control device 30 moves, when the external force applied to the hand H satisfies a second predetermined condition, the control point T1 in the predetermined direction by the predetermined amount on the basis of the force detection information acquired from the force detecting section 21. Consequently, the robot control device 30 moves the hand H in the predetermined direction by the predetermined amount.

When the operation mode is the third mode, the robot control device 30 moves, on the basis of the force detection information acquired from the force detecting section 21, the control point T1 in an applies direction of the external force to the hand H by an amount corresponding to the external force. The robot control device 30 calculates the amount corresponding to the external force on the basis of force control parameters input to the robot control device 30 in advance, an equation of dynamic motion, and the force detection information.

Teaching Points about which the Teaching Device Teaches the Robot Control Device Teaching points about which the teaching device 50 teaches the robot control device 30 are explained below.

The teaching device 50 teaches a final target teaching point and a standby teaching point as the teaching points about which the teaching device 50 teaches the robot control device 30. That is, the teaching device 50 generates pieces of teaching point information respectively indicating the final target teaching point and the standby teaching point. The teaching device 50 outputs the generated teaching point information to the robot control device 30 and causes the robot control device 30 to store the teaching point information.

In this example, the final target teaching point is a teaching point coinciding with the control point T1 when the robot 20 disposes the object O1 in a disposition region RA set on the upper surface of a workbench TB. In this example, the workbench TB is a bench such as a table. The workbench TB is set on a floor surface such that the upper surface of the workbench TB is orthogonal to a Z axis of the robot coordinate system RC. Note that, instead of the bench, the workbench TB may be another object as long as the object is an object including a surface on which the object O1 can be placed such as a floor surface or a shelf. The upper surface of the workbench TB does not have to be orthogonal to the Z axis of the robot coordinate system RC. The workbench TB is an example of a target object.

In this example, the standby teaching point is a teaching point with which the control point T1 is matched before the robot 20 disposes the object O1 in the disposition region RA. The control point T1 is put on standby at the teaching point. The standby teaching point is a teaching point away from the final target teaching point by a first predetermined distance in a positive direction of the Z axis of the robot coordinate system RC. The first distance is, for example, 10 centimeters. Note that, instead of 10 centimeters, the predetermined distance may be a distance shorter than 10 centimeters or may be a distance longer than 10 centimeters as long as the object O1 does not come into contact with the workbench TB.

The teaching device 50 switches the operation mode of the robot control device 30 on the basis of operation received from the user. The robot control device 30, the operation mode of which is switched by the teaching device 50, causes the robot 20 to perform operation corresponding to the present operation mode and matches a position and a posture desired by the user and the position and the posture of the control point T1. When the position and the posture desired by the user and the position and the posture of the control point T1 are matched, the teaching device 50 acquires information indicating the position and the posture of the control point T1 at the present time from the robot control device 30. The teaching device 50 generates teaching point information indicating a teaching point on the basis of the acquired information. Consequently, the teaching device 50 generates teaching point information indicating the standby teaching point and teaching point information indicating the final target teaching point. The teaching device 50 outputs generated these kinds of teaching point information to the robot control device 30 and causes the robot control device 30 to store the generated teaching point information. That is, the teaching device 50 teaches the robot control device 30 about the teaching point information.

The following detailed explanation relates to processing in which the teaching device 50 outputs various instructions to the robot control device 30, processing in which the robot control device 30 switches the operation mode on the basis of the operation mode switching instruction, processing in which the robot control device 30 outputs, on the basis of the position and posture information output instruction, to the teaching device 50, information indicating the position and the posture of the control point T1 at the present time, processing in which the robot control device 30 operates the robot 20 when the operation mode is the second mode, and processing in which the robot control device 30 operates the robot 20 when the operation mode is the first mode.

Hardware Configuration of the Robot Control Device and the Teaching Device

Figure 2:
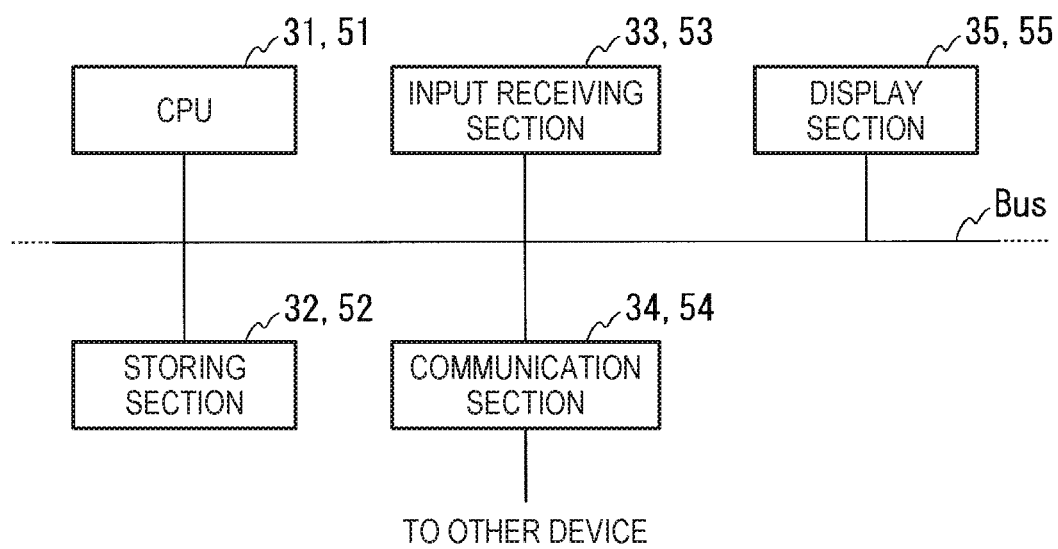
FIG. 2 is a diagram showing an example of a hardware configuration of a robot control device and a teaching device.

A hardware configuration of the robot control device 30 and the teaching device 50 is explained below with reference to FIG. 2. FIG. 2 is a diagram showing an example of the hardware configuration of the robot control device 30 and the teaching device 50. FIG. 2 is a diagram showing a hardware configuration of the robot control device 30 (functional sections added with reference numerals in thirties in FIG. 2) and a hardware configuration of the teaching device 50 (functional sections added with reference numerals in fifties in FIG. 2) together for convenience.

The robot control device 30 includes, for example, a CPU (Central Processing Unit) 31, a storing section 32, an input receiving section 33, a communication section 34, and a display section 35. The robot control device 30 performs communication with each of the robot 20 and the teaching device 50 via the communication section 34. These components are communicatively connected to each other via a bus Bus.

The teaching device 50 includes, for example, a CPU 51, a storing section 52, an input receiving section 53, a communication section 54, and a display section 55. The teaching device 50 performs communication with the robot control device 30 via the communication section 54. These components are communicatively connected to one another via the bus Bus.

The CPU 31 executes various computer programs stored in the storing section 32.

The storing section 32 includes, for example, a HDD (Hard Disk Drive) or an SSD (Solid State Drive), an EEPROM (Electrically Erasable Programmable Read-Only Memory), a ROM (Read-Only Memory), or a RAM (Random Access Memory). Note that the storing section 32 may be, instead of a storing section incorporated in the robot control device 30, an external storage device connected by, for example, a digital input/output port such as the USB. The storing section 32 stores various kinds of information and images to be processed by the robot control device 30, various computer programs including an operation program, and teaching point information.

The input receiving section 33 is, for example, a touch panel configured integrally with the display section 35. Note that the input receiving section 33 may be a keyboard, a mouse, a touch pad, or another input device.

The communication section 34 includes, for example, a digital input/output port such as the USB or the Ethernet (registered trademark) port.

The display section 35 is, for example, a liquid crystal display panel or an organic EL (Electro Luminescence) display panel.

The CPU 51 executes various computer programs stored in the storing section 52.

The storing section 52 includes, for example, a HDD or an SSD, an EEPROM, a ROM, or a RAM. Note that the storing section 52 may be, instead of a storing section incorporated in the teaching device 50, an external storage device connected by, for example, a digital input/output port such as the USB. The storing section 52 stores various kinds of information and images to be processed by the teaching device 50 and the various computer programs.

The input receiving section 53 is, for example, a touch panel configured integrally with the display section 55. Note that the input receiving section 53 may be a keyboard, a mouse, a touch pad, or another input device.

The communication section 54 includes, for example, a digital input/output port such as the USB or the Ethernet (registered trademark).

The display section 55 is, for example, a liquid crystal display panel or an organic EL display panel.

Functional Configuration of the Robot Control Device and the Teaching Device

Figure 3:
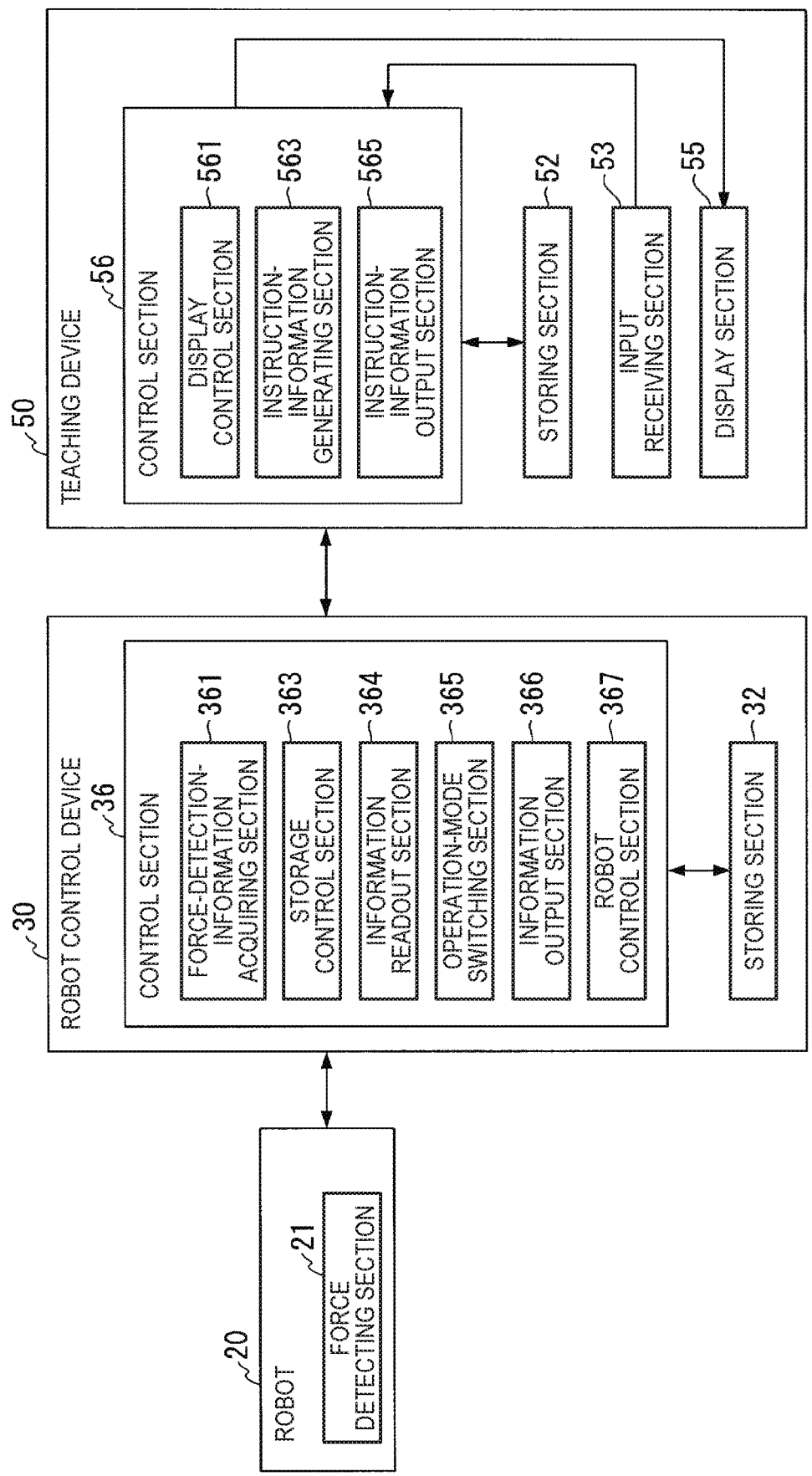
FIG. 3 is a diagram showing an example of a functional configuration of the robot control device and the teaching device.

A functional configuration of the robot control device 30 and the teaching device 50 is explained below with reference to FIG. 3. FIG. 3 is a diagram showing an example of the functional configuration of the robot control device 30 and the teaching device 50.

The robot control device 30 includes the storing section 32 and a control section 36.

The control section 36 controls the entire robot control device 30. The control section 36 includes a force-detection-information acquiring section 361, a storage control section 363, an information readout section 364, an operation-mode switching section 365, an information output section 366, and a robot control section 367. These functional sections included in the control section 36 are realized by, for example, the CPU 31 executing various computer programs stored in the storing section 32. A part or all of the functional sections may be hardware functional sections such as an LSI (Large Scale Integration) and an ASIC (Application Specific Integrated Circuit).

The force-detection-information acquiring section 361 acquires force detection information from the force detecting section 21.

The storage control section 363 causes the storing section 32 to store teaching point information acquired from the teaching device 50.

The information readout section 364 reads out various kinds of information from the storing section 32.

The operation-mode switching section 365 switches, on the basis of an operation mode switching instruction among instructions acquired from the teaching device 50, the operation mode of the robot control device 30 to a mode indicated by the operation mode switching instruction.

The information output section 366 outputs, on the basis of a position and posture information output instruction among the instructions acquired from the teaching device 50, information indicating the position and the posture of the control point T1 at the present time to the teaching device 50.

The robot control section 367 causes, on the basis of force detection information acquired from the force detecting section 21 by the force-detection-information acquiring section 361, the robot 20 to perform operation corresponding to the present operation mode of the robot control device 30. The robot control section 367 operates the robot 20 on the basis of the teaching point information stored in the storing section 32 by the storage control section 363.

The teaching device 50 includes the storing section 52, the input receiving section 53, the display section 55, and a control section 56.

The control section 56 controls the entire teaching device 50. The control section 56 includes a display control section 561, an instruction-information generating section 563, and an instruction-information output section 565. These functional sections included in the control section 56 are realized by, for example, the CPU 51 executing various computer programs stored in the storing section 52. A part or all of the functional sections may be hardware functional sections such as an LSI and an ASIC.

The display control section 561 generates various screens that the display control section 561 causes the display section 55 to display. The display control section 561 causes the display section 55 to display the generated screens.

The instruction-information generating section 563 generates, on the basis of operation received by the user from the screens that the display control section 561 causes the display section 55 to display, various instructions to be output to the robot control device 30.

The instruction-information output section 565 outputs the instructions generated by the instruction-information generating section 563 to the robot control device 30.

Figure 4:
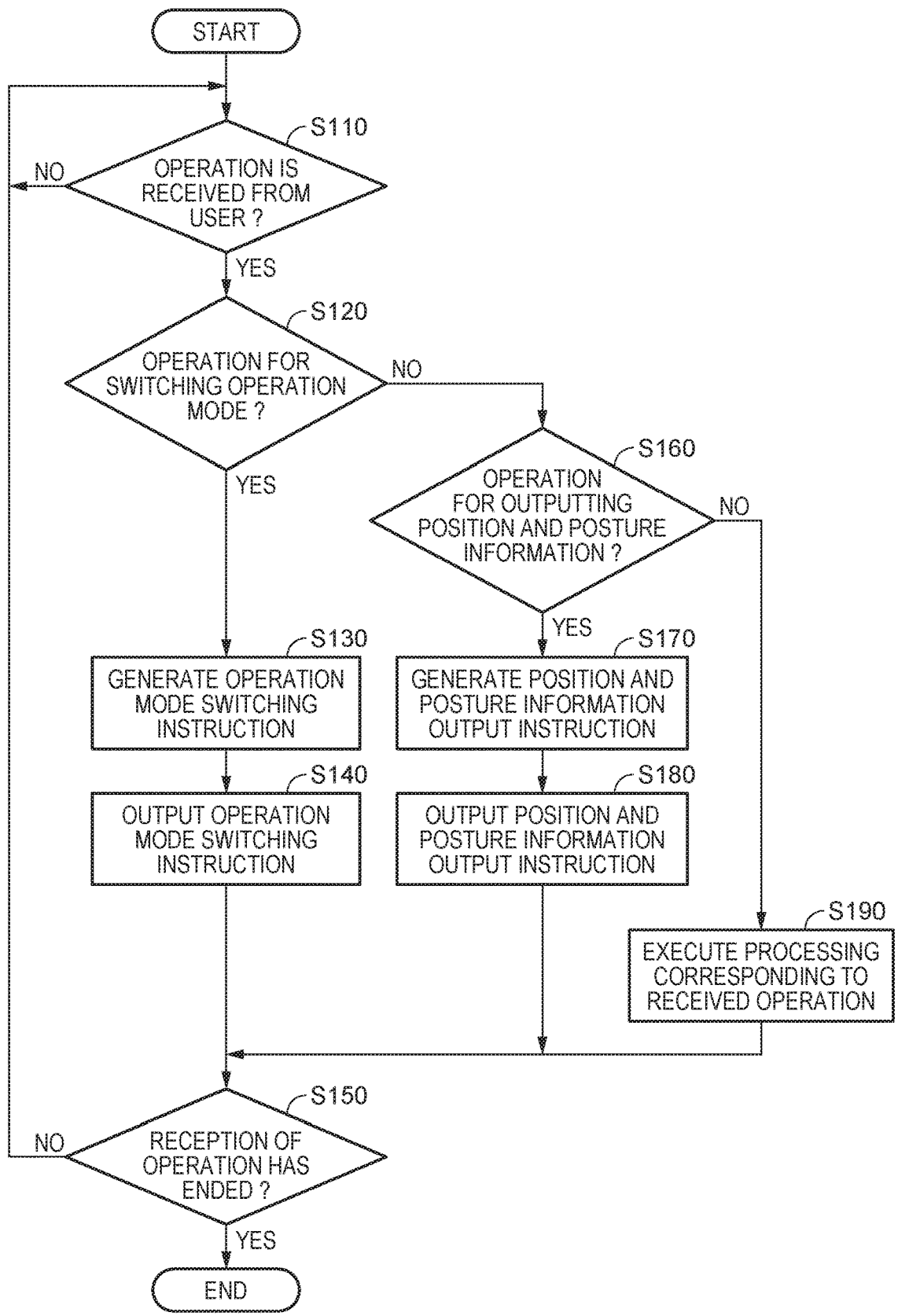
FIG. 4 is a flowchart for explaining an example of a flow of processing in which the teaching device outputs various instructions to the robot control device.

Processing in which the Teaching Device Outputs Various Instructions to the Robot Control Device Processing in which the teaching device 50 outputs various instructions to the robot control device 30 is explained with reference to FIG. 4. FIG. 4 is a flowchart for explaining an example of a flow of the processing in which the teaching device 50 outputs the various instructions to the robot control device 30. Note that, in the flowchart shown in FIG. 4, a main screen for receiving, from the user, operation for outputting the various instructions to the robot control device 30 is already displayed on the display section 55 by the display control section 561.

The instruction-information generating section 563 stays on standby until the operation by the user is received on the main screen (step S110). When determining that the operation by the user is received on the main screen (YES in step S110), the instruction-information generating section 563 determines whether the operation is operation for switching the operation mode of the robot control device 30 (step S120).

For example, when information indicating any one of the first mode to the third mode is selected by the operation received in step S110, the instruction-information generating section 563 determines that the operation is the operation for switching the operation mode of the robot control device 30. On the other hand, when information indicating any one of the first mode to the third mode is not selected by the operation received in step S110, the instruction-information generating section 563 determines that the operation is not the operation for switching the operation mode of the robot control device 30.

When determining that the operation received in step S110 is the operation for switching the operation mode of the robot control device 30 (YES in step S120), the instruction-information generating section 563 generates an operation mode switching instruction including information selected in step S110 and indicating a mode (step S130). The instruction-information output section 565 outputs the operation mode switching instruction generated by the instruction-information generating section 563 in step S130 to the robot control device 30 (step S140).

On the other hand, when determining that the operation received in step S110 is not the operation for switching the operation mode of the robot control device 30 (NO in step S120), the instruction-information generating section 563 determines whether the operation received in step S110 is operation for acquiring the position and the posture of the robot 20 at the present time (in this example, the position and the posture of the control point T1 at the present time) (step S160). When determining that the operation received in step S110 is the operation for acquiring the information indicating the position and the posture of the control point T1 at the present time (YES in step S160), the instruction-information generating section 563 generates a position and posture information output instruction (step S170). The instruction-information generating section 563 outputs the position and posture information output instruction generated in step S170 to the robot control device (step S180).

On the other hand, when determining that the operation received in step S110 is not the operation for acquiring the position and the posture of the control point T1 at the present time (NO in step S160), the instruction-information generating section 563 executes processing corresponding to the operation received in step S110 (step S190). The processing includes processing for generating instructions other than the operation mode switching instruction and the position and posture information output instruction and processing for outputting the generated instruction to the robot control device 30.

After the processing in any one of step S140, step S180, and step S190 is executed, the instruction-information generating section 563 determines whether the reception of the operation from the user on the main screen has ended (step S150). For example, when operation for deleting the main screen is received on the main screen, the instruction-information generating section 563 determines that the reception of the operation from the user on the main screen has ended. On the other hand, when the operation for deleting the main screen is not received on the main screen, the instruction-information generating section 563 determines that the reception of the operation from the user on the main screen has not ended.

When determining that the reception of the operation from the user on the main screen has not ended (NO in step S150), the instruction-information generating section 563 transitions to step S110 and stays on standby until operation by the user is received on the main screen again. On the other hand, when determining that the reception of the operation from the user on the main screen has ended (YES in step S150), the instruction-information generating section 563 ends the processing.

Figure 5:
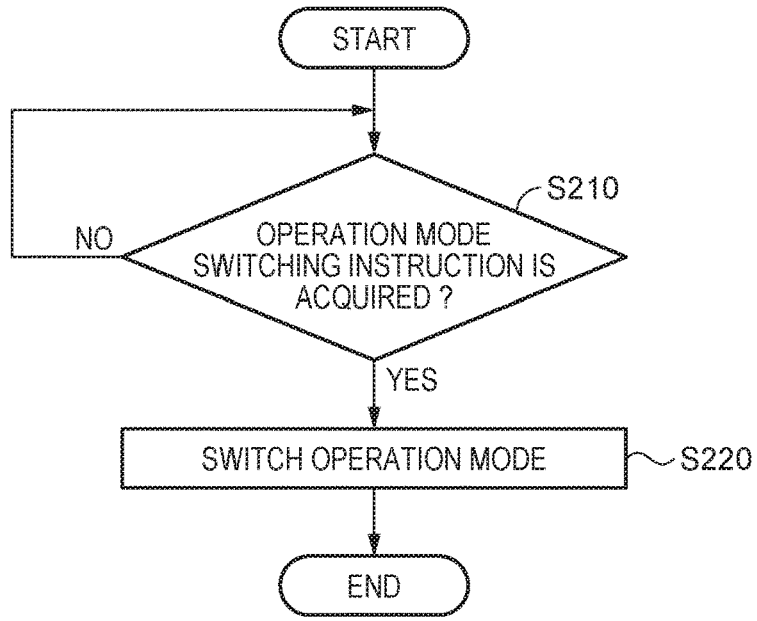
FIG. 5 is a flowchart for explaining an example of a flow of processing in which the robot control device switches an operation mode on the basis of an operation mode switching instruction.

Processing in which the Robot Control Device Switches the Operation Mode on the Basis of an Operation Mode Switching Instruction Processing in which the robot control device 30 switches the operation mode on the basis of an operation mode switching instruction is explained below with reference to FIG. 5. FIG. 5 is a flowchart for explaining an example of a flow of the processing in which the robot control device 30 switches the operation mode on the basis of the operation mode switching instruction.

The operation-mode switching section 365 stays on standby until an operation mode switching instruction is acquired from the teaching device 50 (step S210). When determining that the operation mode switching instruction is acquired from the teaching device 50 (YES in step S210), the operation-mode switching section 365 switches the present operation mode of the robot control device 30 to a mode indicated by the operation mode switching instruction acquired from the teaching device 50 in step S210 (step S220).

Note that a configuration may be adopted in which, for example, the robot 20 includes an operation mode switch and the robot control device 30 acquires an operation mode switching instruction output from the operation mode switch according to operation of the operation mode switch by the user. In this case, the user can switch the operation mode of the robot control device 30 by operating the operation mode switch. The operation mode switch is provided, for example, in a part of the end effector E or the manipulator M.

Figure 6:
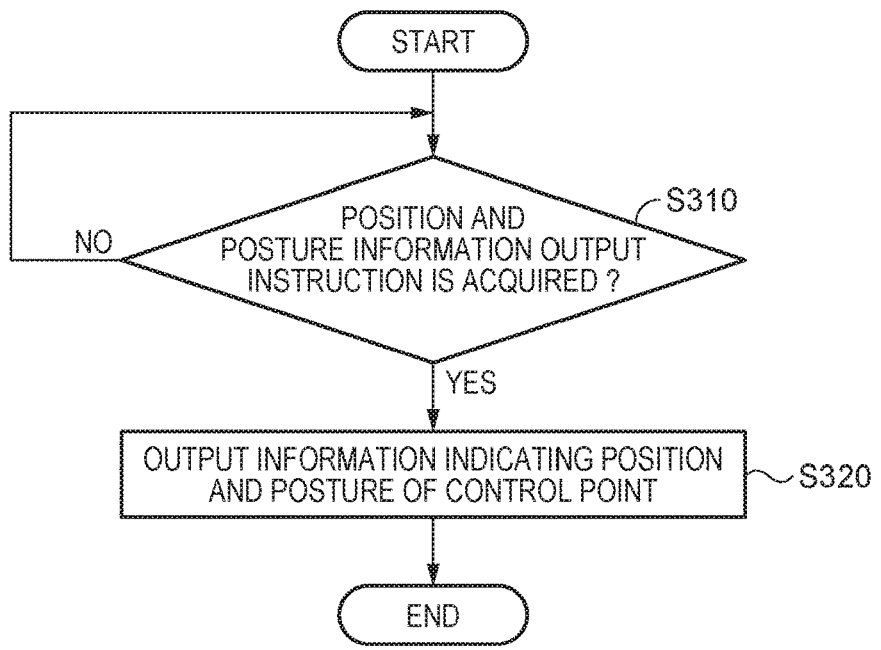
FIG. 6 is a flowchart for explaining an example of a flow of processing in which the robot control device outputs, on the basis of a position and posture information output instruction, information indicating the position and the posture of a control point at the present time to the teaching device.

Processing in which the Robot Control Device Outputs Information Indicating the Position and the Posture of the Control Point at the Present Time to the Teaching Device on the Basis of a Position and Posture Information Output Instruction Processing in which the robot control device 30 outputs, on the basis of a position and posture information output instruction, information indicating the position and the posture of the control point T1 at the present time to the teaching device 50 is explained below with reference to FIG. 6. FIG. 6 is a flowchart for explaining an example of a flow of processing in which the robot control device 30 outputs, on the basis of the position and posture information output instruction, the information indicating the position and the posture of the control point T1 at the present time to the teaching device 50.

The information output section 366 stays on standby until a position and posture information output instruction is acquired from the teaching device 50 (step S310). When the information output section 366 determines that the position and posture information output instruction is acquired from the teaching device 50 (YES in step S310), the robot control section 367 calculates the position and the posture of the control point T1 at the present time. Specifically, the robot control section 367 acquires information indicating rotation angles of the actuators from the encoders included in the joints of the manipulator M. The robot control section 367 calculates the position and the posture of the control point T1 at the present time on the basis of the acquired rotation angles and the forward kinematics. The information output section 366 outputs, to the teaching device 50, information indicating the position and the posture calculated by the robot control section 367 (step S320).

Figure 7:
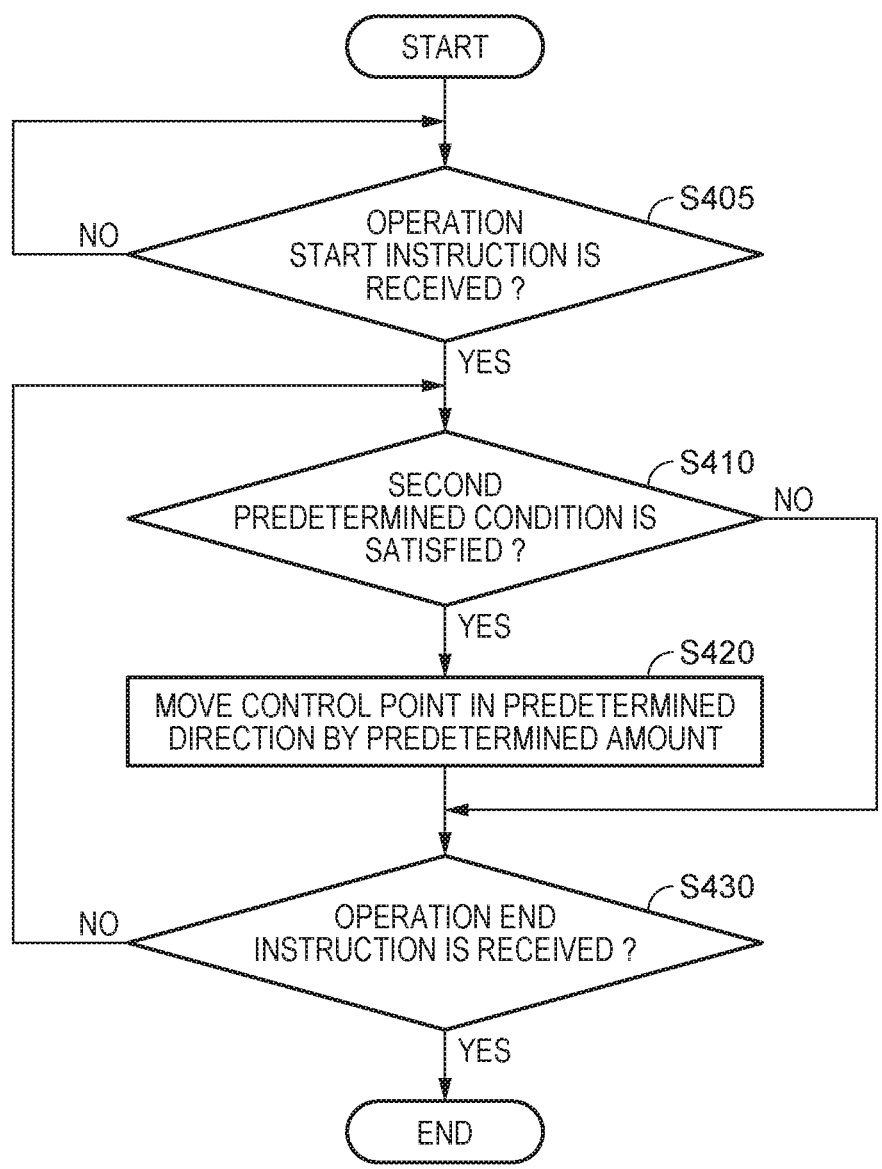
FIG. 7 is a flowchart for explaining an example of a flow of processing in which the robot control device operates the robot when the operation mode is a second mode.

Processing in which the Robot Control Device Operates the Robot when the Operation Mode is the Second Mode Processing in which the robot control device 30 operates the robot 20 when the operation mode is the second mode is explained with reference to FIGS. 7 to 15. FIG. 7 is a flowchart for explaining a flow of the processing in which the robot control device 30 operates the robot 20 when the operation mode is the second mode.

The robot control section 367 stays on standby until an operation start instruction is received (step S405). The operation start instruction means an instruction for causing the robot control device 30 to start, according to the present operation mode, the processing for operating the robot 20. The robot control section 367 may receive the operation start instruction from the user on a screen that a not-shown display control section causes the display section 35 to display, may receive the operation start instruction output from the teaching device 50 on the basis of operation received from the user, or may receive the operation start instruction output from a switch or the like separate from the robot control device 30 and the teaching device 50.

The robot control section 367 may receive, as the operation start instruction, an external force applied to the hand H and satisfying a predetermined operation start condition. The operation start condition is that, for example, the magnitude of a force applied to the hand H in a predetermined operation start direction is equal to or larger than a predetermined first threshold. In this case, the operation start direction is a direction input to the robot control section 367 in advance by the user and is a translational direction for translating the hand H. The operation start direction is desirably a direction different from the predetermined direction explained below but may be a direction same as the predetermined direction. The first threshold is a threshold input to the robot control section 367 in advance by the user and may be any threshold. The operation start condition may be that, instead of the magnitude of the force applied to the hand H in the predetermined operation start direction being equal to or larger than the predetermined first threshold, the magnitude of a moment applied to the hand H in the predetermined operation start direction is equal to or larger than a predetermined second threshold. In this case, the operation start direction is a direction input to the robot control section 367 in advance by the user and is a rotational direction for rotating the hand H. The second threshold is a threshold input to the robot control section 367 in advance by the user and may be any threshold. The operation start condition may be other conditions instead of these conditions.

When determining in step S405 that the operation start instruction is received (YES in step S405), the robot control section 367 determines on the basis of force detection information acquired from the force detecting section 21 by the force-detection-information acquiring section 361 that an external force satisfying the second predetermined condition is applied to the hand H (step S410).

When determining in step S410 that the external force satisfying the second predetermined condition is applied to the hand H (YES in step S410), the robot control section 367 moves the control point T1 in the predetermined direction by the predetermined amount (step S420).

The predetermined direction is a direction input to the robot control section 367 in advance by the user. The predetermined amount is a movement amount input to the robot control section 367 in advance by the user. When the predetermined direction is a translational direction for translating the control point T1, the predetermined amount is a translation movement amount for translating the control point T1 and is, for example, 1 millimeter. Note that the predetermined amount in this case may be a translation movement amount shorter than 1 millimeter or may be a translation movement amount longer than 1 millimeter. When the predetermined direction is a rotational direction for rotating control point T1, the predetermined amount is a rotation angle for rotating the control point T1 and is, for example, 1 degree. Note that, instead of 1 degree, the predetermined amount in this case may be a rotation angle smaller than 1 degree or may be a rotation angle larger than 1 degree. In this way, the predetermined direction is one or both of the translational direction and the rotational direction.

After moving the control point T1 in the predetermined direction by the predetermined amount in step S420, the robot control section 367 determines whether an operation end instruction is received (step S430). The operation end instruction is an instruction for causing the robot control device 30 to end the processing for operating the robot 20. The robot control section 367 may receive the operation end instruction from the user on a screen that the not-shown display control section causes the display section 35 to display, may receive the operation end instruction output from the teaching device 50 on the basis of operation received from the user, or may receive an operation end instruction output from a switch or the like separate from the robot control device 30 and the teaching device 50.

The robot control device 30 may receive, as the operation end instruction, an external force applied to the hand H and satisfying a predetermined end condition. The operation end condition is that, for example, the magnitude of a force applied to the hand H in a predetermined operation end direction is equal to or larger than a predetermined third threshold. In this case, the operation end direction is a direction input to the robot control section 367 in advance by the user and is a translational direction for translating the hand H. The operation end direction is desirably a direction different from the predetermined direction but may be a direction same as the predetermined direction. The third threshold is a threshold input to the robot control section 367 in advance by the user and may be any threshold. The operation end condition may be that, instead of the magnitude of the force applied to the hand H in the predetermined operation end direction being equal to or larger than the predetermined third threshold, the magnitude of a moment applied to the hand H in the predetermined operation end direction is equal to or larger than a predetermined fourth threshold. In this case, the operation end direction is a direction input to the robot control section 367 in advance by the user and is a rotational direction for rotating the hand H. The fourth threshold is a threshold input to the robot control section 367 in advance by the user and may be any threshold. The operation end condition may be other conditions instead of these conditions.

When determining in step S430 that the operation end instruction is not received (NO in step S430), the robot control section 367 transitions to step S410 and stays on standby until the second predetermined condition is satisfied again. On the other hand, when determining that the operation end instruction is received (YES in step S430), the robot control section 367 ends the processing.

On the other hand, when determining in step S410 that the external force satisfying the second predetermined condition is not applied to the hand H (NO in step S410), the robot control section 367 transitions to step S430 and determines whether the operation end instruction is received.

In this way, when operating the robot 20 in the second mode, the robot control device 30 moves the hand H in the predetermined direction by the predetermined amount on the basis of the external force applied to the hand H. Consequently, in the second mode, the robot control section 367 can keep constant the movement amount of the hand H by the external force applied to the hand H by the user. As a result, for example, a desired predetermined amount is input to the robot control section 367 in advance by the user, whereby the robot control device 30 can highly accurately change the position and the posture of the control point T1 to a desired position and a desired posture.

Note that, even if the user continues to apply the external force satisfying the second predetermined condition to the hand H in step S410, the robot control section 367 in this example performs the processing in step S420 only once. That is, even if the user continues to apply the external force satisfying the second predetermined condition to the hand H in step S410, the robot control section 367 does not move the control point T1 in the predetermined direction by a predetermined multiple of the predetermined amount. When the user desires to move the control point T1 in the predetermined direction by the predetermined multiple of the predetermined amount, the user needs to repeat, a predetermined number of times, work from the application of the external force satisfying the second predetermined condition to the hand H to the release of the external force applied to the hand H.

After the robot 20 is operated in the second mode and the position and the posture of the hand H is adjusted by the user, the robot control device 30 outputs information indicating the position and the posture of the control point T1 at the present time to the teaching device 50 according to the processing of the flowchart shown in FIG. 6. The teaching device 50 generates teaching point information on the basis of the information acquired from the robot control device 30.

The teaching device 50 outputs the generated teaching point information to the robot control device 30. The robot control device 30 stores the teaching point information acquired from the teaching device 50. For example, the robot control device 30 stores the teaching point information respectively indicating the standby teaching point and the final target teaching point acquired from the teaching device 50. Consequently, in the second mode, the robot control device 30 can control the robot 20 on the basis of the position and the posture of the control point T1 stored after the hand H is moved in the predetermined direction by the predetermined amount.

The second predetermined condition is explained. The second predetermined condition is that, for example, the magnitude of a force applied to the hand H in a movement executing direction is equal to or larger than a fifth threshold. In this case, the movement executing direction is a direction input to the robot control section 367 in advance by the user and is a translational direction for translating the hand H. The fifth threshold is a threshold input to the robot control section 367 in advance by the user and may be any threshold. Specific examples of the movement executing direction in the second predetermined condition in this case and the predetermined direction are respectively shown in FIGS. 8 to 10.

Figure 8:
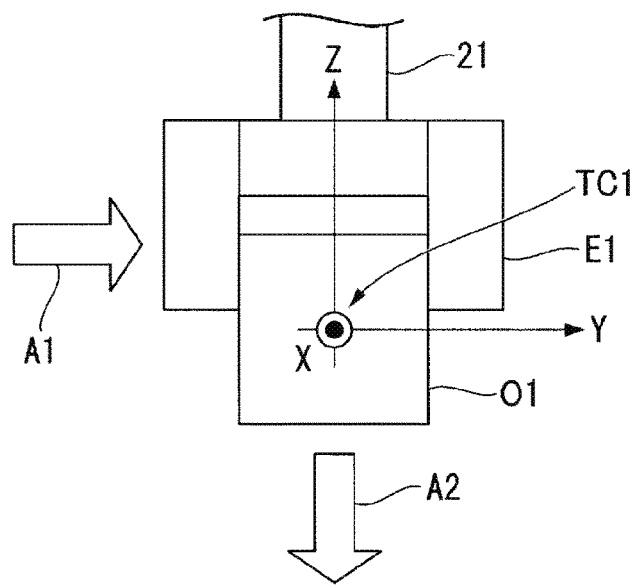
FIG. 8 is a diagram showing a specific example 1 of a movement executing direction in a second predetermined condition and a predetermined direction, the specific example 1 being an example in which both of the movement executing direction and the predetermined direction are translational directions and the movement executing direction and the predetermined direction are directions different from each other.

FIG. 8 is a diagram showing a specific example 1 of the movement executing direction in the second predetermined condition and the predetermined direction. The specific example 1 is an example in which both of the movement executing direction and the predetermined direction are translational directions and the movement executing direction and the predetermined direction are directions different from each other. In FIG. 8, a side view of the hand H viewed from a negative direction to a positive direction of an X axis of the control point coordinate system TC1 is shown.

In FIG. 8, the movement executing direction is indicated by a direction A1 indicated by an arrow. In the example shown in FIG. 8, the movement executing direction is a positive direction of a Y axis of the control point coordinate system TC1. That is, when a force for translating the hand H in the positive direction is applied to the hand H as an external force and the magnitude of the force is equal to or larger than the fifth threshold, the robot control section 367 moves the control point T1 (i.e., the hand H) in the predetermined direction by the predetermined amount. Note that the movement executing direction may be, instead of the positive direction of the Y axis among the coordinate axes of the control point coordinate system TC1, another translational direction for translating the hand H. The other translational direction may be a translational direction along any one of the coordinate axes of the control point coordinate system. TC1 or may be a translational direction along none of the coordinate axes of the control point coordinate system TC1.

In FIG. 8, the predetermined direction is indicated by a direction A2 indicated by an arrow. In the example shown in FIG. 8, the predetermined direction is a negative direction of a Z axis of the control point coordinate system TC1. That is, when a force for translating the hand H in the positive direction of the Y axis of the control point coordinate system TC1 is applied to the hand H as an external force and the magnitude of the force is equal to or larger than the fifth threshold, the robot control section 367 moves the control point T1 (i.e., the hand H) in the negative direction of the Z axis of the control point coordinate system TC1 by the predetermined amount. In this case, the predetermined amount is a movement amount for translating the control point T1. Note that the predetermined direction may be, instead of the negative direction of the Z axis among the coordinate axes of the control point coordinate system TC1, another translational direction for translating the control point T1. The other translational direction may be a translational direction along any one of the coordinate axes of the control point coordinate system TC1 or may be a translational direction along none of the coordinate axes of the control point coordinate system TC1.

Figure 9:
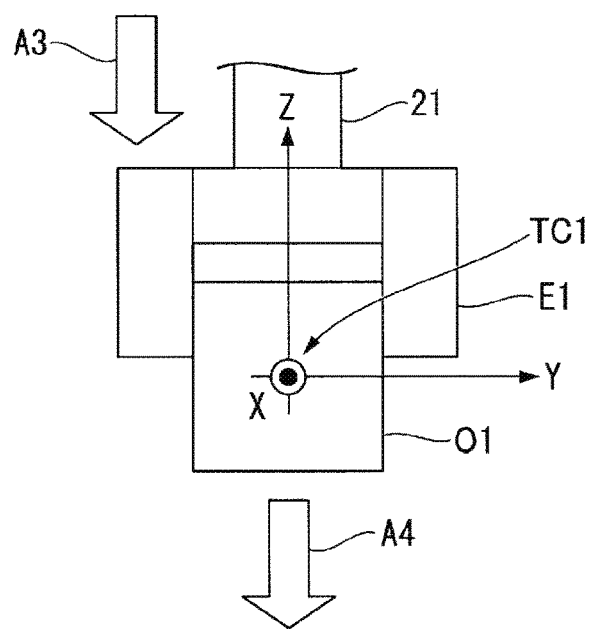
FIG. 9 is a diagram showing a specific example 2 of the movement executing direction in the second predetermined condition and the predetermined direction, the specific example 2 being an example in which both of the movement executing direction and the predetermined direction are translational directions and the movement executing direction and the predetermined direction are the same direction.

FIG. 9 is a diagram showing a specific example 2 of the movement executing direction in the second predetermined condition and the predetermined direction. The specific example 2 is an example in which both of the movement executing direction and the predetermined direction are translational directions and the movement executing direction and the predetermined direction are the same direction. In FIG. 9, a side view of the hand H viewed from the negative direction to the front direction of the X axis of the control point coordinate system TC1 is shown.

In FIG. 9, the movement executing direction is indicated by a direction A3 indicated by an arrow. In the example shown in FIG. 9, the movement executing direction is the negative direction of the Z axis of the control point coordinate system TC1. That is, when a force for translating the hand H in the negative direction is applied to the hand H as an external force and the magnitude of the force is equal to or larger than the fifth threshold, the robot control section 367 moves the control point T1 (i.e., the hand H) in the predetermined direction by the predetermined amount. Note that the movement executing direction may be, instead of the negative direction of the Z axis among the coordinate axes of the control point coordinate system TC1, another translational direction for translating the hand H. The other direction may be a translational direction along any one of the coordinate axes of the control point coordinate system TC1 or may be a translational direction along none of the coordinate axes of the control point coordinate system TC1.

In FIG. 9, the predetermined direction is indicated by a direction A4 indicated by an arrow. In the example shown in FIG. 9, the predetermined direction is a direction same as the movement executing direction and is the negative direction of the Z axis of the control point coordinate system TC1. That is, when a force for translating the hand H in the negative direction of the Z axis of the control point coordinate system TC1 is applied to the hand H as an external force and the magnitude of the force is equal to or larger than the fifth threshold, the robot control section 367 moves the control point T1 (i.e., the hand H) in the negative direction by the predetermined amount. In this case, the predetermined amount is a movement amount for translating the control point T1. Note that the predetermined direction may be, instead of the negative direction of the Z axis among the coordinate axes of the control point coordinate system TC1, another translational direction for translating the control point T1. The other translational direction may be a translational direction along any one of the coordinate axes of the control point coordinate system TC1 or may be a translational direction along none of the coordinate axes of the control point coordinate system TC1.

Figure 10:
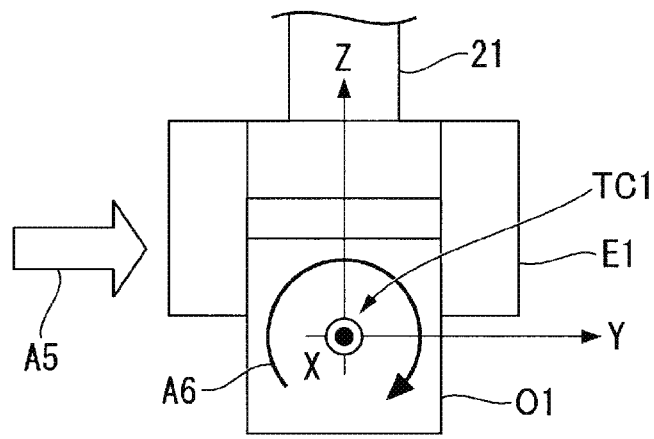
FIG. 10 is a diagram showing a specific example 3 of the movement executing direction in the second predetermined condition and the predetermined direction, the specific example 3 being an example in which the movement executing direction is a translational direction and the predetermined direction is a rotational direction.

FIG. 10 is a diagram showing a specific example 3 of the movement executing direction in the second predetermined condition and the predetermined direction. The specific example 3 is an example in which the movement executing direction is a translational direction and the predetermined direction is a rotational direction. In FIG. 10, a side view of the hand H viewed from the negative direction to the positive direction of the X axis of the control point coordinate system TC1 is shown.

In FIG. 10, the movement executing direction is indicated by a direction A5 indicated by an arrow. In the example shown in FIG. 10, the movement executing direction is the positive direction of the Y axis of the control point coordinate system TC1. That is, when a force for translating the hand H in the positive direction is applied to the hand H as an external force and the magnitude of the force is equal to or larger than the fifth threshold, the robot control section 367 moves the control point T1 (i.e., the hand H) in the predetermined direction by the predetermined amount. Note that the movement executing direction may be, instead of the positive direction of the Y axis among the coordinate axes of the control point coordinate system TC1, another translational direction for translating the hand H. The other translational direction may be a translational direction along any one of the coordinate axes of the control point coordinate system TC1 or may be a translational direction along none of the coordinate axes of the control point coordinate system TC1.

In FIG. 10, the predetermined direction is indicated by a direction A6 indicated by an arrow. In the example shown in FIG. 10, the predetermined direction is a rotational direction for rotating the hand H clockwise around the X axis when the hand H is viewed from the negative direction to the positive direction of the X axis of the control point coordinate system TC1. That is, when a force for translating the hand H in the positive direction of the Y axis of the control point coordinate system TC1 is applied to the hand H as an external force and the magnitude of the force is equal to or larger than the fifth threshold, the robot control section 367 moves the control point T1 (i.e., the hand H) in the rotational direction by the predetermined amount. In this case, the predetermined amount is a rotation amount (a rotation angle) for rotating the control point T1. Note that the predetermined direction may be another rotational direction instead of the rotational direction. The other rotational direction may be a rotational direction around any one of the coordinate axes of the control point coordinate system TC1 or may be a rotational direction around an axis different from all the coordinate axes of the control point coordinate system TC1.

Note that the second predetermined condition may be that, for example, the magnitude of a moment applied to the hand H in the movement executing direction is equal to or larger than a sixth threshold. In this case, the movement executing direction is a direction input to the robot control section 367 in advance by the user and is a rotational direction for rotating the hand H. The sixth threshold is a threshold input to the robot control section 367 in advance by the user and may be any threshold. Specific examples of the movement executing direction in the second predetermined condition in this case and the predetermined direction are respectively shown in FIGS. 11 to 13.

Figure 11:
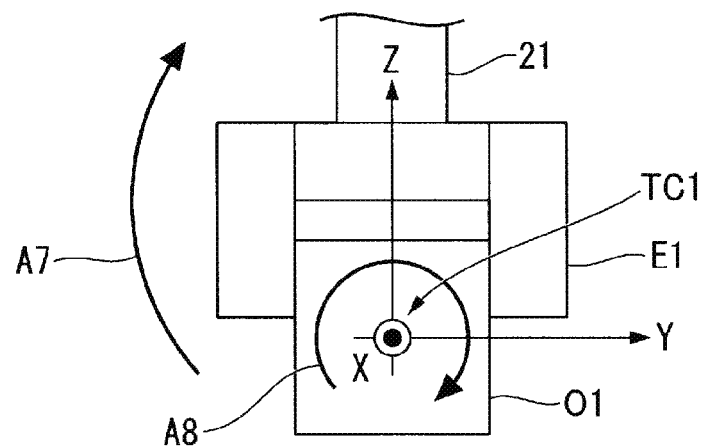
FIG. 11 is a diagram showing a specific example 4 of the movement executing direction in the second predetermined condition and the predetermined direction, the specific example 4 being an example in which both of the movement executing direction and the predetermined direction are rotational directions and the movement executing direction and the predetermined direction are the same direction.

FIG. 11 is a diagram showing a specific example 4 of the movement executing direction in the second predetermined condition and the predetermined direction. The specific example 4 is an example in which both of the movement executing direction and the predetermined direction are rotational directions and the movement executing direction and the predetermined direction are the same direction. In FIG. 11, a side view of the hand H viewed from the negative direction to the positive direction of the X axis of the control point coordinate system TC1 is shown.

In FIG. 11, the movement executing direction is indicated by a direction A7 indicated by an arrow. In the example shown in FIG. 11, the movement executing direction is a rotational direction for rotating the hand H clockwise around the X axis when the hand H is viewed from the negative direction to the positive direction of the X axis of the control point coordinate system TC1. That is, when a moment for rotating the hand H in the rotational direction is applied to the hand H as an external force and the magnitude of the moment is equal to or larger than the sixth threshold, the robot control section 367 moves the control point T1 (i.e., the hand H) in the predetermined direction by the predetermined amount. Note that the movement executing direction may be, instead of the rotational direction, another rotational direction for rotating the hand H. The other rotational direction may be a rotational direction around any one of the coordinate axes of the control point coordinate system TC1 or may be a rotational direction around an axis different from all the coordinate axes of the control point coordinate system TC1.

In FIG. 11, the predetermined direction is indicated by a direction A7 indicated by an arrow. In the example shown in FIG. 11, the predetermined direction is a rotational direction for rotating the hand H clockwise around the X axis when the hand H is viewed from the negative direction to the positive direction of the X axis of the control point coordinate system TC1. That is, when a moment for rotating the hand H in the rotational direction is applied to the hand H as an external force and the magnitude of the moment is equal to or larger than the sixth threshold, the robot control section 367 moves the control point T1 (i.e., the hand H) in the rotational direction by the predetermined amount. In this case, the predetermined amount is a rotation amount (a rotation angle) for rotating the control point T1. Note that the predetermined direction may be, instead of the rotational direction, another rotational direction for rotating the control point T1. The other rotational direction may be a rotational direction around any one of the coordinate axes of the control point coordinate system TC1 or may be a rotational direction around an axis different from all the coordinate axes of the control point coordinate system TC1.

Figure 12:
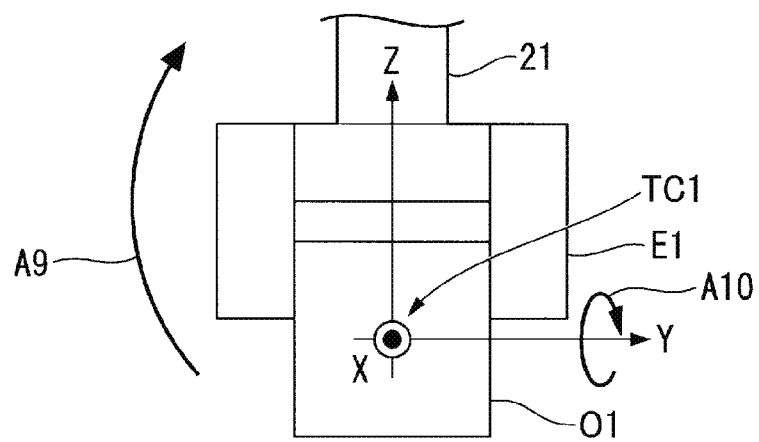
FIG. 12 is a diagram showing a specific example 5 of the movement executing direction in the second predetermined condition and the predetermined direction, the specific example 5 being an example in which both of the movement executing direction and the predetermined direction are rotational directions and the movement executing direction and the predetermined direction are directions different from each other.

FIG. 12 is a diagram showing a specific example 5 of the movement executing direction in the second predetermined condition and the predetermined direction. The specific example 5 is an example in which both of the movement executing direction and the predetermined direction are rotational directions and the movement executing direction and the predetermined direction are directions different from each other. In FIG. 12, a side view of the hand H viewed from the negative direction to the positive direction of the X axis of the control point coordinate system TC1 is shown.

In FIG. 12, the movement executing direction is indicated by a direction A9 indicated by an arrow. In the example shown in FIG. 12, the movement executing direction is a rotational direction for rotating the hand H clockwise around the X axis when the hand H is viewed from the negative direction to the positive direction of the X axis of the control point coordinate system TC1. That is, when a moment for rotating the hand H in the rotational direction is applied to the hand H as an external force and the magnitude of the moment is equal to or larger than the sixth threshold, the robot control section 367 moves the control point T1 (i.e., the hand H) in the predetermined direction by the predetermined amount. Note that the movement executing direction may be, instead of the rotational direction, another rotational direction for rotating the hand H. The other rotational direction may be a rotational direction around any one of the coordinate axes of the control point coordinate system TC1 or may be a rotational direction around an axis different from all the coordinate axes of the control point coordinate system TC1.

In FIG. 12, the predetermined direction is indicated by a direction A10 indicated by an arrow. In the example shown in FIG. 12, the predetermined direction is a rotational direction for rotating the hand H clockwise around the Y axis when the hand H is viewed from the positive direction to the negative direction of the Y axis of the control point coordinate system TC1. That is, when a moment for rotating the hand H around the rotational direction for rotating the hand H clockwise around the X axis when the hand is viewed from the negative direction to the positive direction of the X axis of the control point coordinate system TC1 is applied to the hand H as an external force and the magnitude of the moment is equal to or larger than the sixth threshold, the robot control section 367 moves the control point T1 (i.e., the hand H) in the rotational direction for rotating the hand H clockwise around the Y axis when the hand H is viewed from the positive direction to the negative direction of the Y axis of the control point coordinate system TC1. In this case, the predetermined amount is a rotation amount (a rotation angle) for rotating the control point T1. Note that the predetermined direction may be, instead of the rotational direction, another rotational direction for rotating the control point T1. The other rotational direction may be a rotational direction around any one of the coordinate axes of the control point coordinate system TC1 or may be a rotational direction around an axis different from all the coordinate axes of the control point coordinate system TC1.

Figure 13:
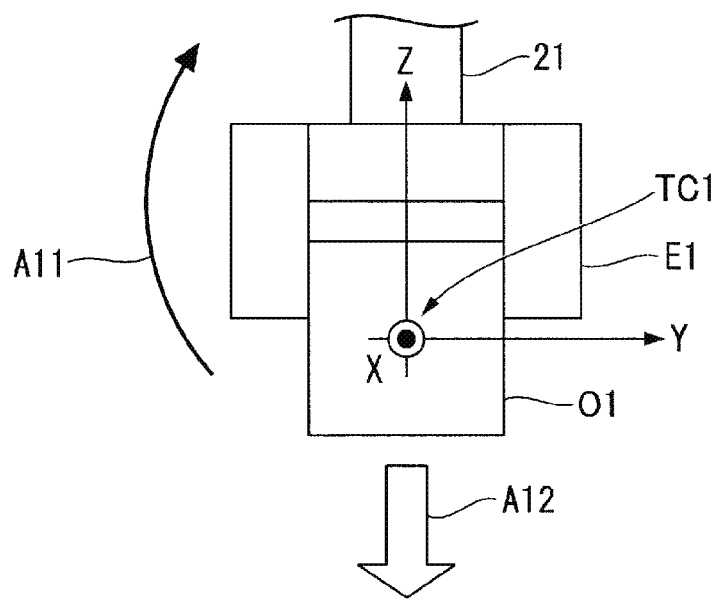
FIG. 13 is a diagram showing a specific example 6 of the movement executing direction in the second predetermined condition and the predetermined direction, the specific example 6 being an example in which the movement executing direction is a rotational direction and the predetermined direction is a translational direction.

FIG. 13 is a diagram showing a specific example 6 of the movement executing direction in the second predetermined condition and the predetermined direction. The specific example 6 is an example in which the movement executing direction is a rotational direction and the predetermined direction is a translational direction. In FIG. 13, a side view of the hand H viewed from the negative direction to the positive direction of the X axis of the control point coordinate system TC1 is shown.

In FIG. 13, the movement executing direction is indicated by a direction A11 indicated by an arrow. In the example shown in FIG. 13, the movement executing direction is a rotational direction for rotating the hand H clockwise around the X axis when the hand H is viewed from the negative direction to the positive direction of the X axis of the control point coordinate system TC1. That is, when a moment for rotating the hand H in the rotational direction is applied to the hand H as an external force and the magnitude of the moment is equal to or larger than the sixth value, the robot control section 367 moves the control point T1 (i.e., the hand H) in the predetermined direction by the predetermined amount. Note that the movement executing direction may be, instead of the rotational direction, another rotational direction for rotating the hand H. The other rotational direction may be a rotational direction around any one of the coordinate axes of the control point coordinate system TC1 or may be a rotational direction around an axis different from all the coordinate axes of the control point coordinate system TC1.

In FIG. 13, the predetermined direction is indicated by a direction A12 indicated by an arrow. In the example shown in FIG. 13, the predetermined direction is the negative direction of the Z axis of the control point coordinate system TC1. That is, when a moment for rotating the hand H in the rotational direction for rotating the hand H clockwise around the X axis when the hand H is viewed from the negative direction to the positive direction of the X axis of the control point coordinate system TC1 is applied to the hand H as an external force and the magnitude of the moment is equal to or larger than the sixth threshold, the robot control section 367 moves the control point T1 (i.e., the hand H) in the negative direction of the Z axis of the control point coordinate system TC1 by the predetermined amount. In this case, the predetermined amount is a movement amount for translating the control point T1. Note that the predetermined direction may be, instead of the negative direction of the Z axis among the coordinate axes of the control point coordinate system TC1, another translational direction for translating the control point T1. The other translational direction may be a translational direction along any one of the coordinate axes of the control point coordinate system TC1 or may be a translational direction along none of the coordinate axes of the control point coordinate system TC1.

Note that, in the second mode, for example, the robot control section 367 may move the control point T1 in the predetermined direction by the predetermined amount when the magnitude of a force applied to the hand H in the movement executing direction is equal to or larger than the fifth threshold and move the control point T1 in a second predetermined direction, which is a direction different from the predetermined direction, by a second predetermined amount, which is an amount different from the predetermined amount, when the force is equal to or larger than a seventh threshold, which is a threshold larger than the fifth threshold. That is, the robot control section 367 may move, according to a stepwise (discrete) difference in the magnitude of the force applied to the hand H, the control point T1 in a direction corresponding to the difference by an amount corresponding to the difference.

When the external force applied to the hand H satisfies the second predetermined condition, the robot control section 367 may change (move) a rotation angle of an actuator included in a predetermined joint in the predetermined direction by the predetermined amount. When the rotation angle of the actuator is changed in the predetermined direction by the predetermined amount, the predetermined direction is a rotational direction of the actuator and the predetermined amount is the rotation angle of the actuator.

When the force detecting section 21 is torque sensors included in the joints of the manipulator M, the robot control section 367 may move, on the basis of an external force applied to any one of the joints, a rotation angle of an actuator included in the predetermined joint or the control point T1 in the predetermined direction by the predetermined amount. When the rotation angle of the actuator is moved in the predetermined direction by the predetermined amount, the predetermined direction is the rotational direction of the actuator and the predetermined amount is the rotation angle of the actuator.

In step S410, when a state in which the external force applies to the hand H satisfies the second predetermined condition continues for a predetermined time or more, the robot control section 367 may determine that the external force applied to the hand H satisfies the second predetermined condition. When the state in which the external force applied to the hand H satisfies the second predetermined condition is realized at least once, the robot control section 367 may determine that the external force applied to the hand H satisfies the second predetermined condition.

Modification of the Processing in which the Robot Control Device Operates the Robot when the Operation Mode is the Second Mode The predetermined direction explained above may be a direction corresponding to a portion of the hand H. The portion means a portion to which an external force is applied. That is, the robot control section 367 moves, on the basis of an external force applied to the hand H, the hand H in a direction corresponding to the portion to which the external force is applied in the portion of the hand H by the predetermined amount. Consequently, the robot control section 367 can cause the user to easily change the direction in which the hand H is moved.

Specific examples of the movement executing direction and the predetermined direction at the time when the predetermined direction is a direction corresponding to a portion of a hand H are explained with reference to FIGS. 14 and 15. Note that, in the specific examples explained below, as an example, the second predetermined condition is that the magnitude of a force applied to the hand H in the movement executing direction is equal to or larger than the fifth threshold. Note that, as in the specific examples explained above, the second predetermined condition may be that the magnitude of a moment applied to the hand H in the movement executing direction is equal to or larger than the sixth threshold.

Figure 14:
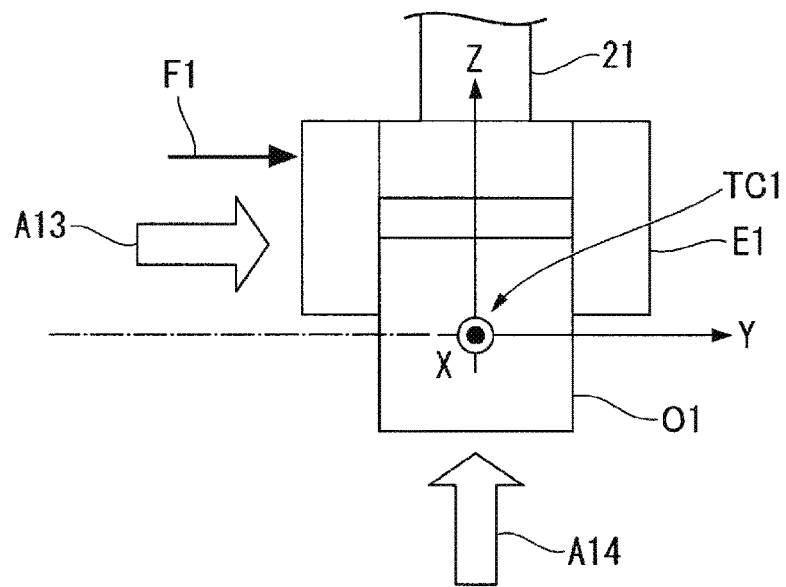
FIG. 14 is a diagram showing a specific example 1 of a movement executing direction and a predetermined direction at the time when the predetermined direction is a direction corresponding to a portion of a hand.

FIG. 14 is a diagram showing a specific example 1 of the movement executing direction and the predetermined direction at the time when the predetermined direction is the direction corresponding to the portion of the hand H. The specific example 1 is an example in which an external force is applied to an upper side portion, which is a portion from the Y axis of the control point coordinate system TC1 to the positive direction side of the Z axis of the control point coordinate system TC1 in the portion of the hand H. In FIG. 14, a side view of the hand H viewed from the negative direction to the positive direction of the X axis of the control point coordinate system TC1 is shown.

In FIG. 14, the movement executing direction is indicated by a direction A13 indicated by an arrow. In FIG. 14, a portion where a force F1 is applied to the hand H is indicated by an arrow. In the example shown in FIG. 14, the movement executing direction is the positive direction of the Y axis of the control point coordinate system TC1. In the example, the external force is applied to the upper side portion of the portion of the hand H. That is, when the force F1 for translating the hand H in the positive direction is applied to the hand H as an external force and the magnitude of the force is equal to or larger than the fifth threshold, the robot control section 367 moves the control point T1 (i.e., the hand H) in the predetermined direction corresponding to the upper side portion of the hand H by the predetermined amount. Note that the movement executing direction may be, instead of the positive direction of the Y axis among the coordinate axes of the control point coordinate system TC1, another translational direction for translating the hand H. The other translational direction may be a translational direction along any one of the coordinate axes of the control point coordinate system TC1 or may be a translational direction along none of the coordinate axes of the control point coordinate system TC1.

In FIG. 14, the predetermined direction is indicated by a direction A14 indicated by an arrow. In the example shown in FIG. 14, the predetermined direction corresponding to the upper side portion of the hand H is the positive direction of the Z axis of the control point coordinate system TC1. That is, when a force for translating the hand H in the positive direction of the Y axis of the control point coordinate system TC1 is applied to the upper side portion of the hand H as an external force and the magnitude of the force is equal to or larger than the fifth threshold, the robot control section 367 moves the control point T1 (i.e., the hand H) in the positive direction of the Z axis of the control point coordinate system TC1 by the predetermined amount. In this case, the predetermined amount is a movement amount for translating the control point T1. Note that the predetermined direction may be, instead of the positive direction of the Z axis among the coordinate axes of the control point coordinate system TC1, another translational direction for translating the control point T1. The other translational direction may be a translational direction along any one of the coordinate axes of the control point coordinate system TC1 or may be a translational direction along none of the coordinate axes of the control point coordinate system TC1. The predetermine direction may be a rotational direction instead of the translational direction.

Figure 15:
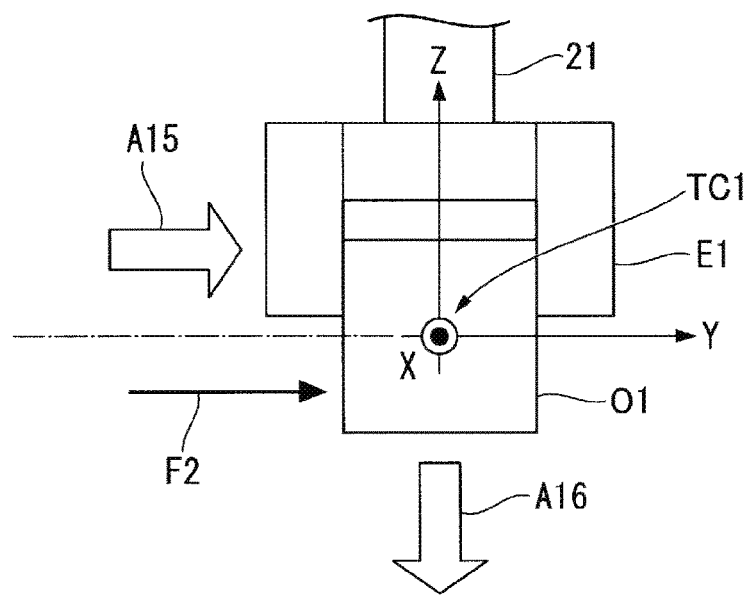
FIG. 15 is a diagram showing a specific example 2 of the movement executing direction and the predetermined direction at the time when the predetermined direction is the direction corresponding to the portion of the hand.

FIG. 15 is a diagram showing a specific example 2 of the movement executing direction and the predetermined direction at the time when the predetermined direction is the direction corresponding to the portion of the hand H. The specific example 2 is an example in which an external force is applied to a lower side portion, which is a portion from the Y axis of the control point coordinate system TC1 to the negative direction side of the Z axis of the control point coordinate system TC1 in the portion of the hand H. In FIG. 15, a side view of the hand H viewed from the negative direction to the positive direction of the X axis of the control point coordinate system TC1 is shown.

In FIG. 15, the movement executing direction is indicated by a direction A15 indicated by an arrow. In FIG. 15, a portion where a force F2 is applied to the hand H is indicated by an arrow. In the example shown in FIG. 15, the movement executing direction is the positive direction of the Y axis of the control point coordinate system TC1. In the example, an external force is applied to a lower side portion of the portion of the hand H. That is, when the force F2 for translating the hand H in the positive direction is applied to the hand H as an external force and the magnitude of the force is equal to or larger than the fifth threshold, the robot control section 367 moves the control point T1 (i.e., the hand H) in the predetermined direction corresponding to the lower side portion of the hand H by the predetermined amount. Note that, the movement executing direction may be, instead of the positive direction of the Y axis among the coordinate axes of the control point coordinate system TC1, another translational direction for translating the hand H. The other translational direction may be a translational direction along any one of the coordinate axes of the control point coordinate system. TC1 or may be a translational direction along none of the coordinate axes of the control point coordinate system TC1.

In FIG. 15, the predetermined direction is indicated by a direction A16 indicated by an arrow. In the example shown in FIG. 15, the predetermined direction corresponding to the lower side portion of the hand H is the negative direction of the Z axis of the control point coordinate system TC1. That is, when a force for translating the hand H in the positive direction of the Y axis of the control point coordinate system TC1 is applied to the lower side portion of the hand H as an external force and the magnitude of the force is equal to or larger than the fifth threshold, the robot control section 367 moves the control point T1 (i.e., the hand H) in the negative direction of the Z axis of the control point coordinate system TC1 by the predetermined amount. In this case, the predetermined amount is a movement amount for translating the control point T1. Note that the predetermined direction may be, instead of the negative direction of the Z axis among the coordinate systems of the control point coordinate system TC1, another translational direction for translating the control point T1. The other translational direction may be a translational direction along any one of the coordinate axes of the control point coordinate system TC1 or may be a translational direction along none of the coordinate axes of the control point coordinate system TC1. The predetermined direction may be a rotational direction instead of the translational direction.

In this way, the robot control section 367 moves, on the basis of an external force applied to the hand H, the hand H in a direction corresponding to a portion to which the external force is applied in the portion of the hand H by the predetermined amount. Consequently, the control robot section 367 can cause the user to easily change the direction in which the hand H is moved.

Processing in which the Robot Control Device Operates the Robot when the Operation Mode is the First Mode Processing in which the robot control device 30 operates the robot 20 when the operation mode is the first mode is explained below with reference to FIGS. 16 to 18.

Figure 16:
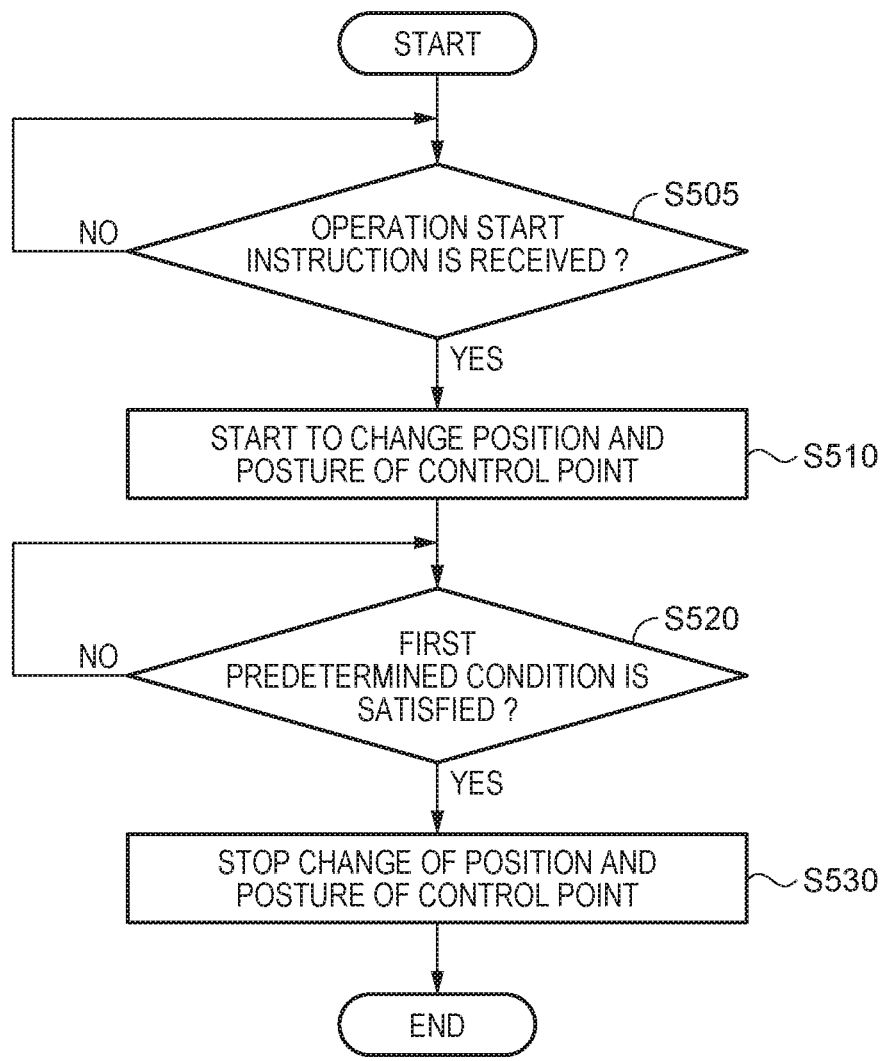
FIG. 16 is a flowchart for explaining an example of a flow of processing in which the robot control device operates the robot when the operation mode is a first mode.

FIG. 16 is a flowchart for explaining an example of a flow of the processing in which the robot control device 30 operates the robot 20 when the operation mode is the first mode. Note that, in the flowchart shown in FIG. 16, the control point T1 already coincides with the standby teaching point. For example, in the second mode or the third mode, the robot control device 30 can match the control point T1 with the standby teaching point on the basis of an external force applied to the hand H by the user. In the following explanation, the operation mode of the robot control device 30 is already switched to the first mode.

The robot control section 367 stays on standby until an operation start instruction is received (step S505). The robot control section 367 may receive the operation start instruction from the user on a screen that the not-shown display control section causes the display section 35 to display, may receive the operation start instruction output from the teaching device 50 on the basis of operation received from the user, or may receive the operation start instruction output from a switch or the like separate from the robot control device 30 and the teaching device 50. The robot control section 367 may receive, as the operation start instruction, an external force applied to the hand H and satisfying a predetermined operation start condition.

When determining in step S505 that the operation start instruction is received (YES in step S505), the robot control section 367 starts to change, on the basis of force detection information acquired from the force detecting section 21 by the force-detection-information acquiring section 361, the position and the posture of the control point T1 to a position and a posture for realizing a state in which an external force applied to the hand H satisfies the first predetermined condition (step S510). Specifically, the robot control section 367 calculates the position and the posture for realizing the state on the basis of force control parameters input to the robot control section 367 in advance, an equation of dynamic motion, and the force detection information. The robot control section 367 starts to change the position and the posture of the control point T1 to the calculated position and the calculated posture.

In this example, the first predetermined condition in that three conditions 1) to 3) described below are satisfied. Note that the first predetermined condition may be that other conditions are satisfied instead of a part or all of the three conditions or may be that other conditions are satisfied in addition to the three conditions.

1) The magnitude of a force applied in the positive direction of the Z axis of the control point coordinate system TC1 in a force applied to the hand H is equal to or larger than a predetermined value 2) The magnitude of forces applied in the X-axis direction and the Y-axis direction of the control point coordinate system TC1 in the force applied to the hand H is 0 [N]

3) The magnitude of a moment around each of the coordinate axes of the control point coordinate system TC1 in a moment applied to the hand H is 0 [N·m]

Note that the condition 1) describe above may be that the magnitude of a force applied in the negative direction of the Z axis of the control point coordinate system TC1 in the force applied to the hand H is equal to or larger than the predetermined value, may be that the magnitude of a force applied in the positive direction or the negative direction of the X axis of the control point coordinate system TC1 in the force applied to the hand H is equal to or larger than the predetermined value, or may be that the magnitude of a force applied in the positive direction or the negative direction of the Y axis of the control point coordinate system TC1 in the force applied to the hand H is equal to or larger than the predetermined value. In this example, the positive direction of the Z axis of the control point coordinate system TC1 is a translational direction and is an example of a first direction. The rotational direction around each of the coordinate axes of the control point coordinate system TC1 is an example of a second direction.

When the first predetermined condition is that each of the three conditions 1) to 3) is satisfied, the robot control section 367 moves the position of the control point T1 in the positive direction of the Z axis of the control point coordinate system TC1 while keeping the posture of the control point T1. The processing in step S510 is explained with reference to FIG. 17. FIG. 17 is a diagram showing an example of a positional relation between the hand H and the workbench TB at timing immediately before the position and the posture of the control point T1 start to change in step S510. In FIG. 17, a side view of the hand H viewed from the negative direction to the positive direction of the X axis of the control point coordinate system TC1 is shown. As shown in FIG. 17, at the timing, the control point T1 coincides with a standby teaching point µl. In FIG. 17, since it is hard to distinguish a range of a disposition region RA in the side view, the disposition region RA is indicated by a thick line.

Figure 17:
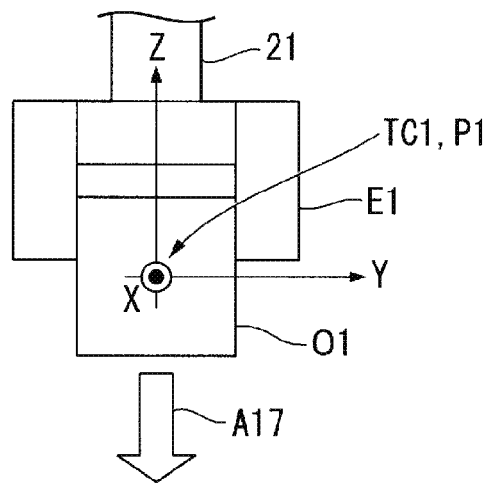
FIG. 17 is a diagram showing an example of a positional relation between the hand and a workbench at timing immediately before the position and the posture of a control point start to change in step S510.
Figure 17:
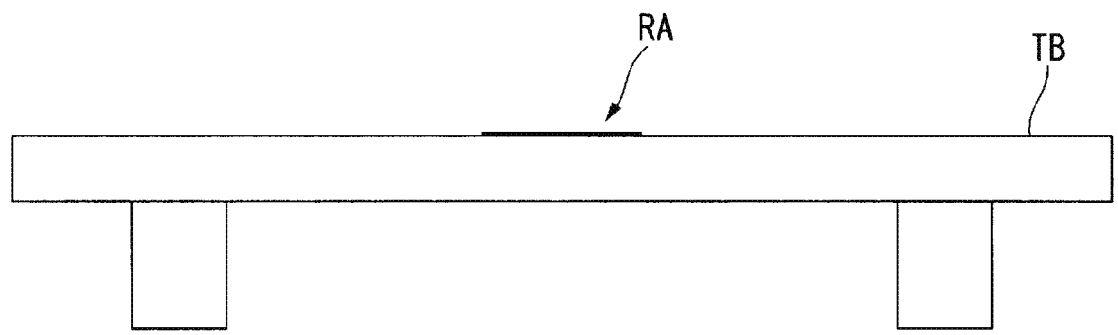
Figure 18:
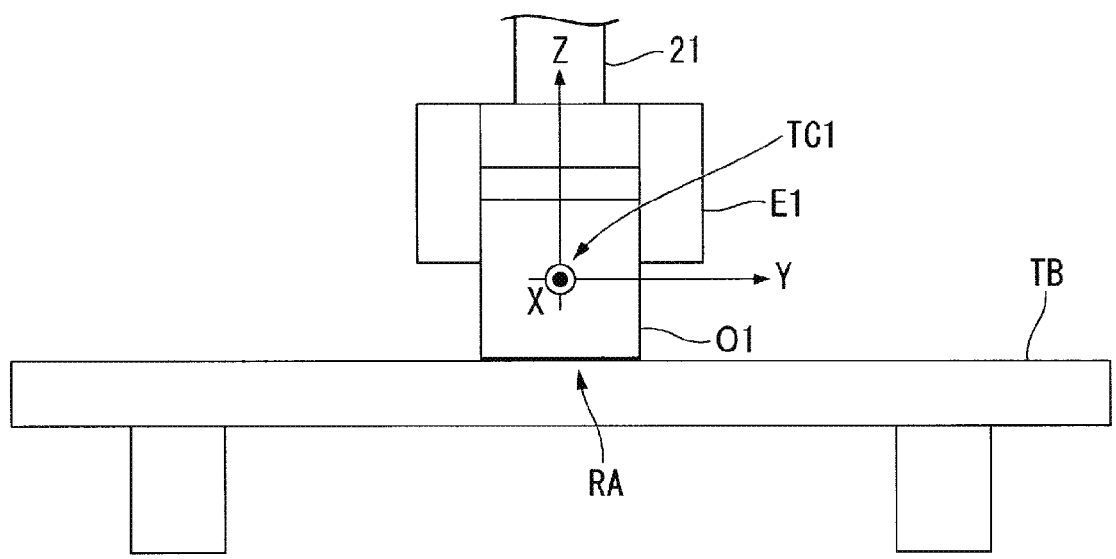
FIG. 18 is a diagram showing an example of a positional relation between the hand and the workbench at timing immediately before the change of the position and the posture of the control point is stopped in step S530.

In the example shown in FIG. 17, an external force is not applied to the hand H at the timing. That is, since a moment applied to the hand H at the timing already satisfies the condition 3) described above, the robot control section 367 keeps the posture of the control point T1 in step S510. Since forces applied in the X-axis direction and the Y-axis direction of the control point coordinate system TC1 in a force applied to the hand H at the timing already satisfies the condition 2) described above, the robot control section 367 keeps the positions in the X-axis direction and the Y-axis direction of the control point T1 in step S510. Since a force applied in the positive direction of the Z axis of the control point coordinate system TC1 in the force applied to the hand H at the timing does not satisfy the condition 1) described above, in step S510, the robot control section 367 starts to move the hand H in a direction opposite to the positive direction such that a force in the positive direction is applied to the hand H. In FIG. 17, the positive direction is indicated by a direction A17 indicated by an arrow.

After starting to change the position and the posture of the control point T1 in step S510, the robot control section 367 continues, on the basis of force detection information acquired from the force detecting section 21 by the force-detection-information acquiring section 361, the movement of the control point T1 started in step S510 until the first predetermined condition is satisfied (step S520). When determining that the first predetermined condition is satisfied (YES in step S520), the robot control section 367 determines that the position and the posture of the control point T1 coincide with a position and a posture desired by the user and stops the change of the position and the posture of the control point T1 (step S530).

The processing in step S530 is explained with reference to FIG. 18. FIG. 18 is a diagram showing an example of a positional relation between the hand H and the workbench TB at timing immediately before the change of the position and the posture of the control point T1 is stopped in step S530. In FIG. 18, a side view of the hand H viewed from the negative direction to the positive direction of the X axis of the control point coordinate system TC1 is shown. In FIG. 18, since it is hard to distinguish a range of the disposition region RA in the side view, the disposition region RA is indicated by a thick line. In the example shown in FIG. 18, normal reaction from the workbench TB is applied to the hand H as an external force at the timing. When the normal reaction increases to be a predetermined value or more because of the change of the position and the posture of the control point T1 started in step S510, since an external force applied to the hand H at the timing satisfies the first predetermined condition, the robot control section 367 stops the change of the position and the posture of the control point T1.

In this way, in operating the robot 20 in the first mode, the robot control device 30 changes the position and the posture of the control point T1 to a position and a posture for realizing a state in which the external force applied to the hand H satisfies the first predetermined condition. Consequently, in the first mode, the robot control section 367 can highly accurately change the position and the posture of the robot 20 to a desired position and a desired posture associated with the workbench TB without causing the user to apply an external force to the hand H. As a result, for example, when a condition desired by the user is input to the robot control section 367 as the first predetermined condition, the robot control device 30 can accurately perform adjustment of the position and the posture of the hand H.

After the robot control device 30 operates the robot 20 in the first mode and the adjustment of the position and the posture of the hand H is performed by the user, the robot control device 30 outputs information indicating the position and the posture of the control point T1 at the present time to the teaching device 50 according to the processing of the flowchart shown in FIG. 6. The teaching device 50 generates teaching point information on the basis of the information acquired from the robot control device 30. The teaching device 50 outputs the generated teaching point information to the robot control device 30. The robot control device 30 stores the teaching point information acquired from the teaching device 50. For example, the robot control device 30 stores teaching point information indicating a final target teaching point acquired from the teaching device 50. Consequently, in the first mode, the robot control device 30 can operate the robot 20 on the basis of the position and the posture of the control point T1 stored when the first predetermined condition is satisfied.

Fine Adjustment by the First Mode and the Second Mode

As explained above, when the robot control device 30 operates the robot 20 in the first mode and the second mode, the robot control device 30 can accurately perform adjustment of the position and the posture of the hand H. That is, the robot control device 30 can perform fine adjustment of the position and the posture of the hand H.

Such fine adjustment is performed in, for example, direct teaching. In the direct teaching, the robot control device 30 operates the robot 20 according to the third mode. Therefore, the user applies an external force to the hand H to change the position and the posture of the hand H. However, it is difficult for the user to accurately apply an external force desired by the user to the hand H. Therefore, the user causes the robot control device 30 to operate the robot 20 according to the third mode to thereby bring the position and the posture of the hand H to the position and the posture desired by the user and thereafter causes the robot control device 30 to operate the robot 20 according to one or both of the first mode and the second mode. That is, in the direct teaching for storing the position and the posture of the hand H, the robot control device 30 performs teaching according to one or both of the first mode for moving the robot 20 until the external force applied to the hand H satisfies the first predetermined condition and the second mode for moving the robot 20 on the basis of the external force applied to the hand H. Consequently, the robot control device 30 can accurately match the position and the posture of the hand H with the position and the posture desired by the user.

Note that such fine adjustment may be performed in, instead of the direct teaching, online teaching in which the user operates a jog key to thereby cause the robot control device 30 to operate the robot 20 and cause the robot control device 30 to store the position and the posture of the hand H or teaching based on a method to be developed in future.

As explained above, when storing the position and the posture of the robot (in this example, the robot 20), the control device 25 switches the first mode for moving the robot until an external force applied to the hand (in this example, the hand H) satisfies the predetermined condition (in this example, the first predetermined condition) and the second mode for moving the robot on the basis of an external force applied to the first part (in this example, the hand H) included in the robot. Consequently, the control device 25 can highly accurately change the position and the posture of the robot to a desired position and a desired posture according to the first mode or the second mode.

In the first mode, the control device 25 brings the hand close to the target object (in this example, the workbench TB) according to control based on an output of the force detecting section (in this example, the force detecting section 21) until the predetermined condition is satisfied. Consequently, in the first mode, the control device 25 can highly accurately change the position and the posture of the robot to a desired position and a desired posture associated with the target object without causing the user to apply an external force to the hand.

In the first mode, the control device 25 moves the robot until at least an external force toward the first direction in the external force applied to the hand increases to be larger than 0 and at least an external force toward the second direction (in this example, the rotational direction around each of the coordinate axes of the control point coordinate system TC1) different from the first direction (in this example, the positive direction of the Z axis of the control point coordinate system TC1) in the external force applied to the hand decreases to 0. Consequently, in the first mode, the control device 25 can move the position of the robot in a direction opposite to the first direction while keeping the posture of the robot.

In the first mode, the control device 25 moves the robot until at least a force toward the first direction, which is a translational direction, in the force applied to the hand increases to be larger than 0 and a moment toward the second direction, which is a rotational direction, decreases to 0. Consequently, in the first mode, the control device 25 can move the position of the robot in a direction opposite to the first direction, which is the translational direction, while keeping the posture of the robot.

In the first mode, when the predetermined condition is satisfied, the control device 25 stores the position and the posture of the robot (in this example, the position and the posture of the control point T1) at the present time. Consequently, in the first mode, the control device 25 can operate the robot on the basis of the position and the posture of the robot stored when the predetermined condition is satisfied.

In the second mode, the control device 25 moves the second part (in this example, the hand H) included in the robot in the predetermined direction by the predetermined amount on the basis of an external force applied to the first part (in this example, the hand H) included in the robot. Consequently, in the second mode, the control device 25 can highly accurately change the position and the posture of the robot to a desired position and a desired posture on the basis of an external force applied to the first part by the user.

After moving the second part in the predetermined direction by the predetermined amount, the control device 25 stores the position and the posture of the robot at the present time. Consequently, in the second mode, the control device 25 can control the robot on the basis of the position and the posture of the robot stored after the second part is moved in the predetermined direction by the predetermined amount.

After moving the second part in one or both of the translational direction and the rotational direction by the predetermined amount, the control device 25 stores the position and the posture of the hand at the present time. Consequently, in the second mode, the control device 25 can control the robot on the basis of the position and the posture stored after the second part is moved in one or both of the translational direction and the rotational direction by the predetermined amount.

The control device 25 moves, according to an external force applied to the first part include in the robot, the second part in a direction corresponding to a portion to which the external force is applied (in this example, the upper side portion or the lower side portion) in the portion of the first part by the predetermined amount. Consequently, the control device 25 can cause the user to easily change a direction in which the second part is moved.

The embodiment of the invention is explained in detail above with reference to the drawings. However, a specific configuration is not limited to the embodiment and may be, for example, changed, substituted, or deleted without departing from the spirit of the invention.

It is also possible to record, in a computer-readable recording medium, a computer program for realizing functions of any components in the devices (e.g., the control device 25, the robot control device 30, and the teaching device 50) explained above, cause a computer system to read the computer program, and execute the computer program. Note that the "computer system" includes an OS (an operating system) or hardware such as peripheral devices. The "computer-readable recording medium" refers to a portable medium such as a flexible disk, a magneto-optical disk, a ROM, or a CD (Compact Disk)-ROM or a storage device such as a hard disk incorporated in the computer system. Further, the "computer-readable recording medium"

includes a recording medium that stores a computer program for a fixed time such as a volatile memory (a RAM) inside a computer system functioning as a server or a client when a computer program is transmitted via a network such as the Internet or a communication line such as a telephone line.

The computer program may be transmitted from a computer system, which stores the computer program in a storage device or the like, to another computer system via a transmission medium or by a transmission wave in the transmission medium. The "transmission medium", which transmits the computer program, refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in a combination with a computer program already recorded in the computer system, a so-called differential file (a differential program).

What is claimed is:

1. A robot control method for causing a processor to execute a process, the method comprising executing on the processor the steps of:
   detecting an external force applied to a hand of a robot by a force sensor, the robot having a manipulator, the manipulator being provided at the hand, the force sensor being provided at the manipulator;
   determining whether a magnitude of the detected external force is equal to or greater than a predetermined threshold;
   moving the hand in a predetermined direction by a predetermined amount by moving the manipulator in response to the determined magnitude,
   acquiring an operation mode switching instruction for the robot from a teaching device; and
   switching between a first mode and a second mode,
   wherein the first mode corresponds to an operation in which the hand moves in the predetermined direction by the predetermined amount by moving the manipulator in response to the determined magnitude, and
   the second mode corresponds to an operation in which the hand moves in a direction by an amount directly corresponding to the magnitude of the detected external force.

2. The robot control method according to claim 1,
   wherein, after the hand moves in the predetermined direction by the predetermined amount, the processor is further configured to:
   calculate a current position of a control point on the manipulator;
   output information corresponding to the current position of the control point to a teaching device; and
   store the information in a memory.

3. The robot control method according to claim 1, the method comprising executing on the processor the steps of:
   acquiring teaching point information from a teaching device;
   generating a control signal for the robot in response to the acquired teaching point information; and
   operating the robot in response to the control signal.

4. The robot control method according to claim 1,
   wherein the external force applied to the hand is in a first direction, and the first direction is the same as the predetermined direction.

5. The robot control method according to claim 1,
   wherein the external force applied to the hand is in a first direction, and the first direction is different from the predetermined direction.

6. A robot control method for causing a processor to execute a process, the method comprising executing on the processor the steps of:
   detecting an external force in a first direction applied to a hand of a robot by a force sensor, the robot having a manipulator, the manipulator being provided at the hand, the force sensor being provided at the manipulator;
   determining whether a magnitude of the detected external force is equal to or greater than a predetermined threshold;
   moving the hand in the first direction by a predetermined amount by moving the manipulator in response to the determined magnitude;
   acquiring an operation mode switching instruction for the robot from a teaching device; and
   switching between a first mode and a second mode,
   wherein the first mode corresponds to an operation in which the hand moves in the predetermined direction by the predetermined amount by moving the manipulator in response to the determined magnitude, and
   the second mode corresponds to an operation in which the hand moves in a direction by an amount directly corresponding to the magnitude of the detected external force.

7. The robot control method according to claim 6,
   wherein, after the hand moves in the predetermined direction by the predetermined amount, the processor is further configured to:
   calculate a current position of a control point on the manipulator;
   output information corresponding to the current position of the control point to a teaching device; and
   store the information in a memory.

8. The robot control method according to claim 6, the method comprising executing on the processor the steps of:
   acquiring teaching point information from a teaching device;
   generating a control signal for the robot in response to the acquired teaching point information; and
   operating the robot in response to the control signal.

* * * * *